(12) United States Patent
Yoon et al.

(10) Patent No.: US 12,218,380 B2
(45) Date of Patent: Feb. 4, 2025

(54) MANUFACTURING METHOD FOR ELECTRODE ASSEMBLY AND ELECTRODE ASSEMBLY MANUFACTURING EQUIPMENT

(71) Applicant: LG Energy Solution, Ltd., Seoul (KR)

(72) Inventors: Se Hyun Yoon, Daejeon (KR); Beomsu Kim, Daejeon (KR); Yong Nam Kim, Daejeon (KR); Heeyong Kim, Daejeon (KR); Dong Hyeuk Park, Daejeon (KR); Dong Myung Kim, Daejeon (KR); Jae Han Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 63 days.

(21) Appl. No.: 17/860,429

(22) Filed: Jul. 8, 2022

(65) Prior Publication Data
US 2023/0015931 A1    Jan. 19, 2023

(30) Foreign Application Priority Data

Jul. 9, 2021 (KR) .................. 10-2021-0090588
Jul. 9, 2021 (KR) .................. 10-2021-0090589
(Continued)

(51) Int. Cl.
H01M 10/04    (2006.01)
H01M 4/04    (2006.01)
(Continued)

(52) U.S. Cl.
CPC ............ *H01M 50/46* (2021.01); *H01M 4/043* (2013.01); *H01M 4/0471* (2013.01);
(Continued)

(58) Field of Classification Search
CPC .................................................. H01M 4/043
See application file for complete search history.

(56) References Cited

U.S. PATENT DOCUMENTS 9,209,491 B2    12/2015 Kim et al.
9,793,535 B2    10/2017 Yu et al.
(Continued)

FOREIGN PATENT DOCUMENTS

CN    002763997 Y    3/2006
CN    210403945 U    4/2020
(Continued)

OTHER PUBLICATIONS

International Search Report for Application No. PCT/KR2022/010010 mailed Oct. 28, 2022, pp. 1-3.
(Continued)

*Primary Examiner* — Jeffry H Aftergut
(74) *Attorney, Agent, or Firm* — Lerner David LLP

(57) ABSTRACT

An electrode assembly manufacturing method includes the steps of: assembling an electrode stack; performing a primary heat press operation on the electrode stack while engaging the electrode stack with a gripper; and then performing a secondary heat press operation on the electrode stack while the gripper is disengaged from the electrode stack. The secondary heat press operation may include applying heat and pressure to the electrode stack for a time period from 5 seconds to 60 seconds under a temperature condition from 50° C. to 90° C. and under a pressure condition from 1 Mpa to 6 Mpa. The step of assembling the electrode stack may include alternately stacking first and second electrodes on an elongated separator sheet, and sequentially folding the separator sheet over a previously-stacked one of the electrodes before a subsequent electrode is stacked. An apparatus for performing the manufacturing method is also disclosed.

17 Claims, 8 Drawing Sheets

(30) Foreign Application Priority Data

| Jul. 9, 2021 | (KR) | 10-2021-0090590 |
| Jul. 9, 2021 | (KR) | 10-2021-0090591 |
| Jul. 9, 2021 | (KR) | 10-2021-0090592 |
| Jul. 9, 2021 | (KR) | 10-2021-0090596 |
| Jul. 9, 2021 | (KR) | 10-2021-0090597 |
| Jul. 9, 2021 | (KR) | 10-2021-0090598 |
| Jul. 9, 2021 | (KR) | 10-2021-0090600 |
| Jul. 9, 2021 | (KR) | 10-2021-0090601 |

(51) Int. Cl.
  *H01M 10/0525* (2010.01)
  *H01M 10/0583* (2010.01)
  *H01M 50/46* (2021.01)
  *H01M 50/463* (2021.01)
  *H01M 50/466* (2021.01)

(52) U.S. Cl.
  CPC ... *H01M 10/0404* (2013.01); *H01M 10/0431* (2013.01); *H01M 10/045* (2013.01); *H01M 10/0459* (2013.01); *H01M 10/0468* (2013.01); *H01M 10/0525* (2013.01); *H01M 10/0583* (2013.01); *H01M 50/463* (2021.01); *H01M 50/466* (2021.01)

(56) References Cited

U.S. PATENT DOCUMENTS

| 10,333,126 | B2 | 6/2019 | Joo et al. |
| 10,985,356 | B2 | 4/2021 | Joo et al. |
| 2005/0186479 | A1 | 8/2005 | Totsuka et al. |
| 2006/0019154 | A1 | 1/2006 | Imachi et al. |
| 2007/0202394 | A1 | 8/2007 | Viavattine |
| 2008/0280208 | A1 | 11/2008 | Naoi et al. |
| 2009/0029259 | A1 | 1/2009 | Okazaki et al. |
| 2009/0136844 | A1 | 5/2009 | Watanabe et al. |
| 2010/0167176 | A1 | 7/2010 | Kawai |
| 2011/0052964 | A1 | 3/2011 | Kim et al. |
| 2011/0104550 | A1 | 5/2011 | Ahn et al. |
| 2013/0306237 | A1 | 11/2013 | Nagasaka et al. |
| 2014/0050958 | A1 | 2/2014 | Kwon et al. |
| 2014/0205879 | A1 | 7/2014 | Jang et al. |
| 2015/0033527 | A1 | 2/2015 | Park et al. |
| 2015/0162638 | A1 | 6/2015 | Bernini et al. |
| 2015/0180082 | A1 | 6/2015 | Jung et al. |
| 2015/0188108 | A1 | 7/2015 | Miyazawa et al. |
| 2016/0006072 | A1 | 1/2016 | Cho et al. |
| 2016/0028064 | A1 | 1/2016 | Choi et al. |
| 2016/0036087 | A1 | 2/2016 | Na et al. |
| 2016/0380301 | A1 | 12/2016 | Kosaka et al. |
| 2017/0125794 | A1 | 5/2017 | Zhao et al. |
| 2018/0076424 | A1 | 3/2018 | Kato |
| 2018/0090787 | A1 | 3/2018 | Makino et al. |
| 2018/0102568 | A1 | 4/2018 | Otohata |
| 2018/0205109 | A1 | 7/2018 | Cho et al. |
| 2018/0233725 | A1 | 8/2018 | Yasuda et al. |
| 2018/0233752 | A1 | 8/2018 | Herrmann et al. |
| 2018/0248219 | A1 | 8/2018 | Kim et al. |
| 2018/0294509 | A1 | 10/2018 | Liu et al. |
| 2018/0342722 | A1 | 11/2018 | Zeng et al. |
| 2019/0044177 | A1 | 2/2019 | Lee et al. |
| 2019/0051924 | A1 | 2/2019 | Kim et al. |
| 2020/0127334 | A1 | 4/2020 | Pyo et al. |
| 2020/0185753 | A1 | 6/2020 | Kwon |
| 2020/0227787 | A1 | 7/2020 | Kang et al. |
| 2020/0227788 | A1 | 7/2020 | Chun et al. |
| 2020/0235434 | A1 | 7/2020 | Lee et al. |
| 2020/0335813 | A1 | 10/2020 | Oh et al. |
| 2021/0050616 | A1 | 2/2021 | Taguchi et al. |
| 2021/0351431 | A1 | 11/2021 | Hwang |
| 2022/0006161 | A1 | 1/2022 | Kim et al. |
| 2023/0036396 | A1 | 2/2023 | Hosokawa et al. |

FOREIGN PATENT DOCUMENTS

| EP | 2856552 | B1 | | 5/2016 |
| EP | 3905417 | A1 | | 11/2021 |
| EP | 3985778 | A1 | | 4/2022 |
| EP | 4027421 | A1 | | 7/2022 |
| JP | S45-005056 | Y1 | | 3/1970 |
| JP | h02046663 | A | | 2/1990 |
| JP | H08138722 | A | | 5/1996 |
| JP | 2002-208442 | A | | 7/2002 |
| JP | 2002-367628 | A | * | 12/2002 |
| JP | 2003-151615 | A | | 5/2003 |
| JP | 2003-201352 | A | * | 7/2003 |
| JP | 2005243455 | A | | 9/2005 |
| JP | 2006032246 | A | | 2/2006 |
| JP | 2008-091192 | A | | 4/2008 |
| JP | 2008282739 | A | | 11/2008 |
| JP | 2009-218105 | A | | 9/2009 |
| JP | 2009259719 | A | | 11/2009 |
| JP | 2010199281 | A | | 9/2010 |
| JP | 2012033275 | A | | 2/2012 |
| JP | 2013-149477 | A | | 8/2013 |
| JP | 2013-254629 | A | | 12/2013 |
| JP | 2015-141791 | A | | 8/2015 |
| JP | 2015531989 | A | | 11/2015 |
| JP | 2015532766 | A | | 11/2015 |
| JP | 2016103425 | A | | 6/2016 |
| JP | 2017-016946 | A | | 1/2017 |
| JP | 2018-018712 | A | | 2/2018 |
| JP | 2018-41703 | A | | 3/2018 |
| JP | 2018510472 | A | | 4/2018 |
| JP | 2018-181843 | A | | 11/2018 |
| JP | 2018-532240 | A | | 11/2018 |
| JP | 2019153427 | A | | 9/2019 |
| JP | 2019199028 | A | | 11/2019 |
| JP | 2020145123 | A | | 9/2020 |
| JP | 6844476 | B2 | | 3/2021 |
| KR | 2008-0063523 | A | | 7/2008 |
| KR | 20100051353 | A | | 5/2010 |
| KR | 20110048132 | A | | 5/2011 |
| KR | 101058786 | B1 | | 8/2011 |
| KR | 101209010 | B1 | | 12/2012 |
| KR | 20130132230 | A | | 12/2013 |
| KR | 20140002718 | A | | 1/2014 |
| KR | 20140022447 | A | | 2/2014 |
| KR | 2014-0060797 | A | | 5/2014 |
| KR | 2014-0064405 | A | | 5/2014 |
| KR | 20140062761 | A | | 5/2014 |
| KR | 20150016671 | A | | 2/2015 |
| KR | 20150020667 | A | | 2/2015 |
| KR | 2015-0022264 | A | | 3/2015 |
| KR | 2015-0035079 | A | | 4/2015 |
| KR | 20150034944 | A | | 4/2015 |
| KR | 20150049892 | A | | 5/2015 |
| KR | 20150050505 | A | | 5/2015 |
| KR | 101531234 | B1 | | 6/2015 |
| KR | 20150144183 | A | | 12/2015 |
| KR | 101595621 | B1 | | 2/2016 |
| KR | 20160054219 | A | | 5/2016 |
| KR | 101643593 | B1 | | 7/2016 |
| KR | 20160108116 | A | | 9/2016 |
| KR | 101704759 | B1 | | 2/2017 |
| KR | 101761720 | B1 | | 7/2017 |
| KR | 101784033 | B1 | | 10/2017 |
| KR | 20180006324 | A | | 1/2018 |
| KR | 101826894 | B1 | | 2/2018 |
| KR | 101838350 | B1 | | 3/2018 |
| KR | 20180037847 | A | | 4/2018 |
| KR | 20180061872 | A | | 6/2018 |
| KR | 20180128770 | A | | 12/2018 |
| KR | 101941144 | B1 | | 1/2019 |
| KR | 101963313 | B1 | | 3/2019 |
| KR | 20190054491 | A | | 5/2019 |
| KR | 20190056812 | A | | 5/2019 |
| KR | 20190064977 | A | | 6/2019 |
| KR | 101995038 | B1 | | 7/2019 |
| KR | 102044363 | B1 | | 11/2019 |
| KR | 20200023852 | A | | 3/2020 |
| KR | 20200023853 | A | | 3/2020 |

(56) References Cited

FOREIGN PATENT DOCUMENTS

| | | |
|---|---|---|
| KR | 20200023854 A | 3/2020 |
| KR | 20200036641 A | 4/2020 |
| KR | 20200061033 A | 6/2020 |
| KR | 20200067575 A | 6/2020 |
| KR | 20200069171 A | 6/2020 |
| KR | 20200094325 A | 8/2020 |
| KR | 20200095896 A | 8/2020 |
| KR | 20200145375 A | 12/2020 |
| KR | 20210033327 A | 3/2021 |
| KR | 102253132 B1 | 5/2021 |
| KR | 20210049297 A | 5/2021 |
| KR | 20210051155 A | 5/2021 |
| KR | 20210051164 A | 5/2021 |
| KR | 102256438 B1 | 6/2021 |
| KR | 102265741 B1 | 6/2021 |
| KR | 20210135861 A | 11/2021 |
| WO | 2006120959 A1 | 11/2006 |
| WO | 2016-152922 A1 | 9/2016 |
| WO | 2017018456 A1 | 2/2017 |
| WO | 2018116295 A1 | 6/2018 |
| WO | 2019188719 A1 | 10/2019 |
| WO | 2021/131879 A1 | 7/2021 |

OTHER PUBLICATIONS

International Search Report for Application No. PCT/KR2022/010006 mailed Nov. 4, 2022, pp. 1-3.
Written Opinion of the ISA for PCT/KR2022/010004 mailed Oct. 26, 2022. 4 pgs.
Written Opinion of the ISA for PCT/KR2022/010003 mailed Nov. 2, 2022. 3 pgs.
Written Opinion of the ISA for PCT/KR2022/010000 mailed Oct. 26, 2022. 4 pgs.
International Search Report for Application No. PCT/KR2022/010005 mailed Nov. 8, 2022, pp. 1-3.
International Search Report for Application No. PCT/KR2022/010009 mailed Nov. 4, 2022, pp. 1-3.
International Search Report for Application No. PCT/KR2022/010001 mailed Nov. 8, 2022, pp. 1-3.
International Search Report for Application No. PCT/KR2022/010008 mailed Nov. 4, 2022, pp. 1-3.
International Search Report for Application No. PCT/KR2022/010007 mailed Oct. 28, 2022, pp. 1-3.
Extended European Search Report including Written Opinion for Application No. 22838071.3 dated Jun. 24, 2024, pp. 1-8.
Extended European Search Report for Application No. 22838066.3 dated Aug. 5, 2024, pp. 1-5.

* cited by examiner

[FIG. 1]
[FIG. 2]
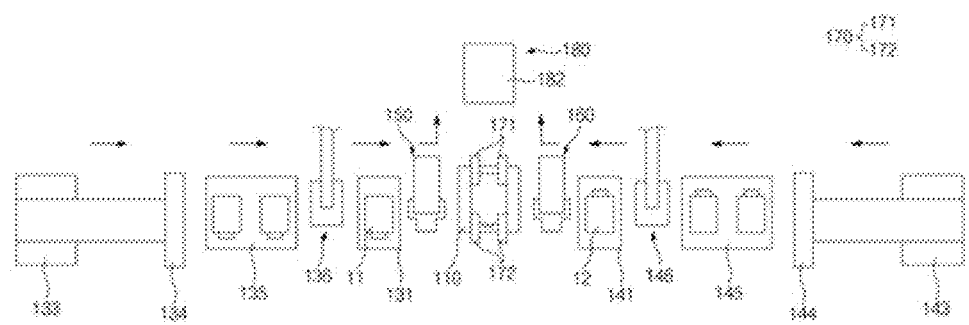
[FIG. 3]
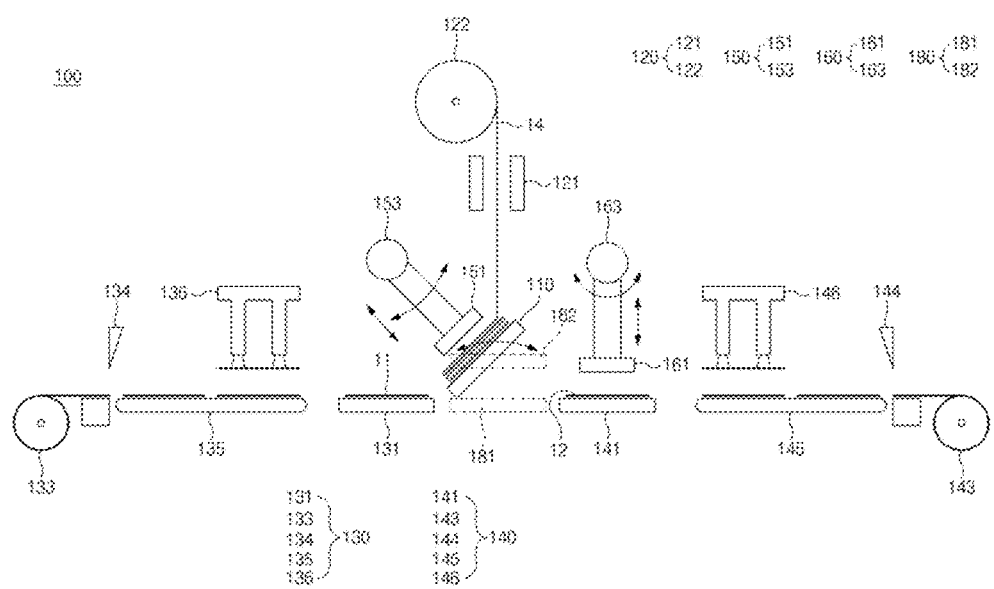

[FIG. 4]
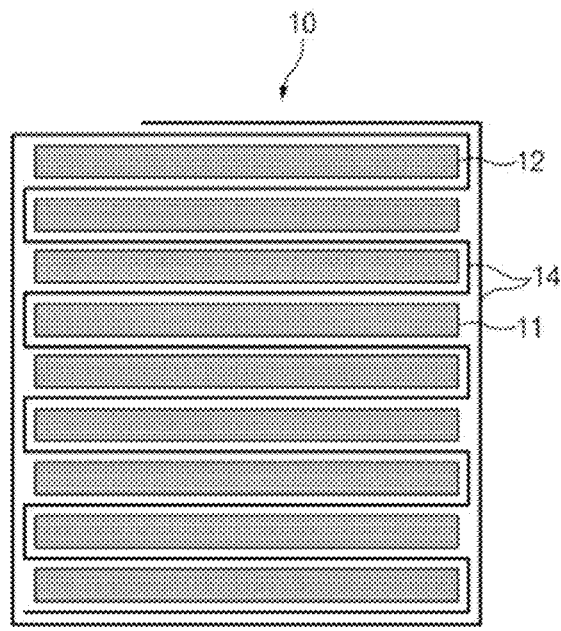
[FIG. 5]
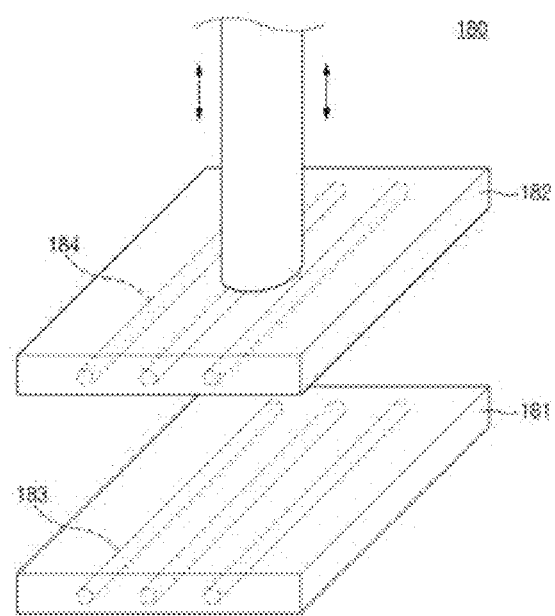

[FIG. 6]
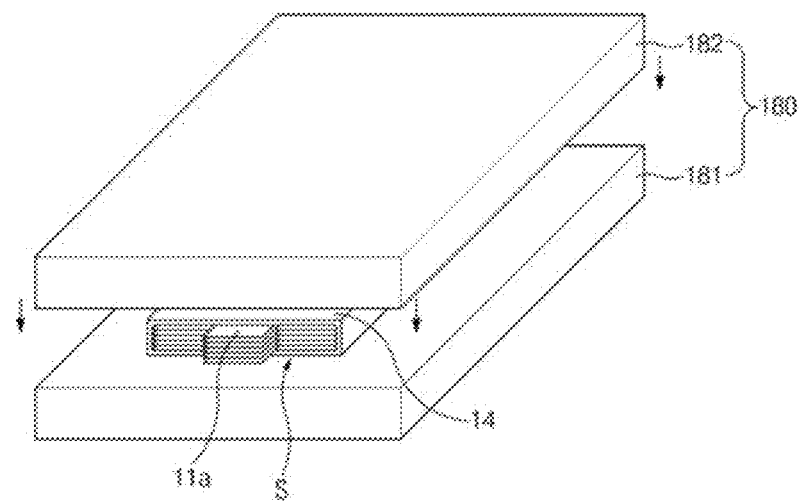
[FIG. 7]
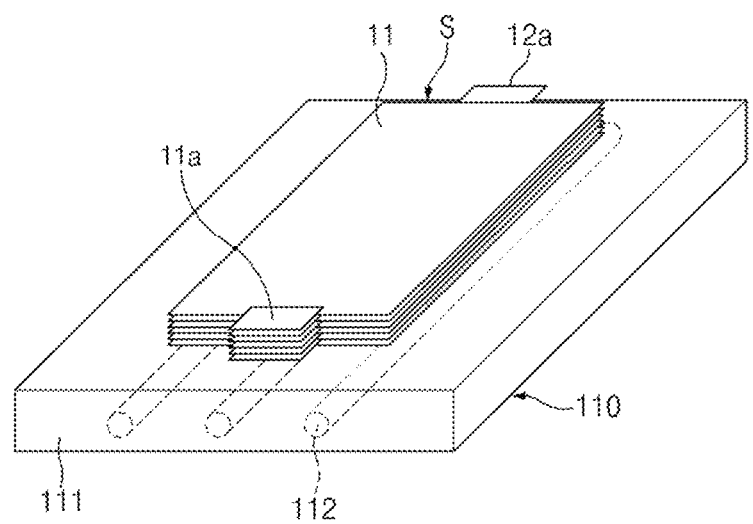

[FIG. 8]
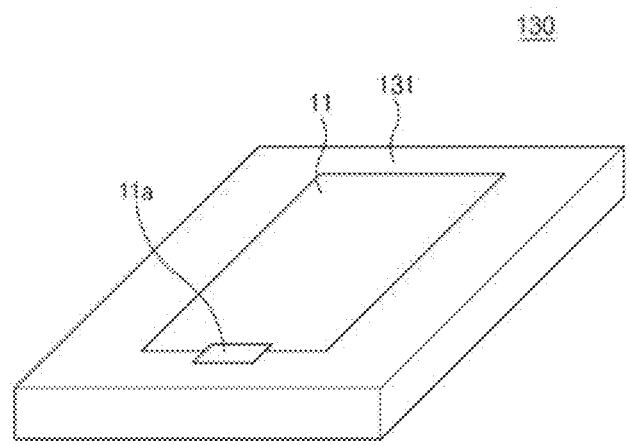
[FIG. 9]
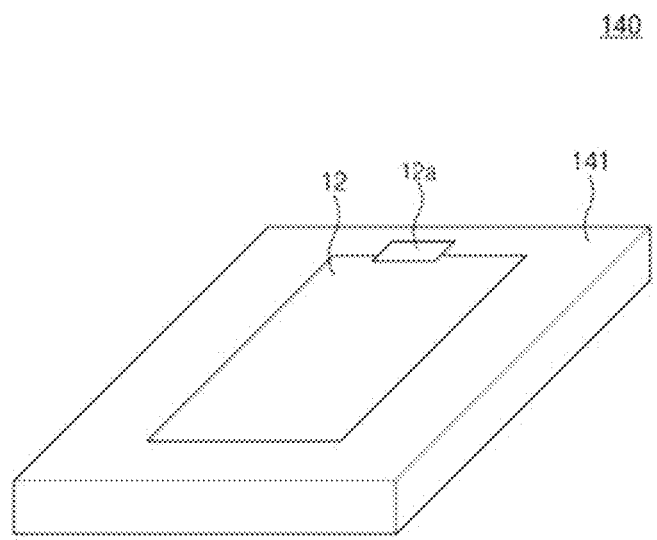

[FIG. 10]
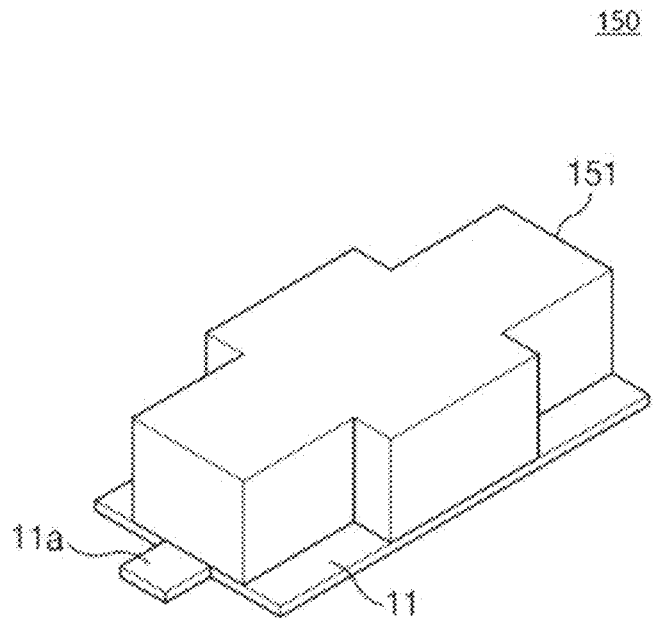
[FIG. 11]
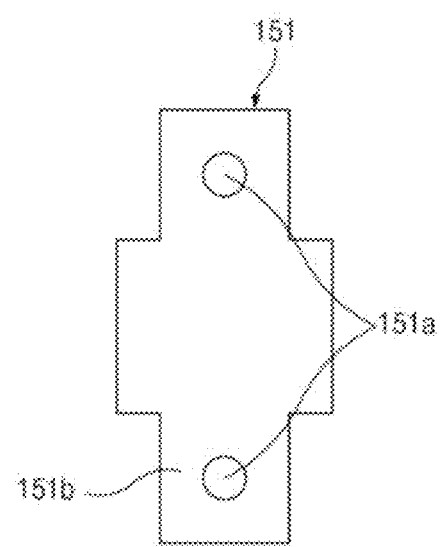

[FIG. 12]
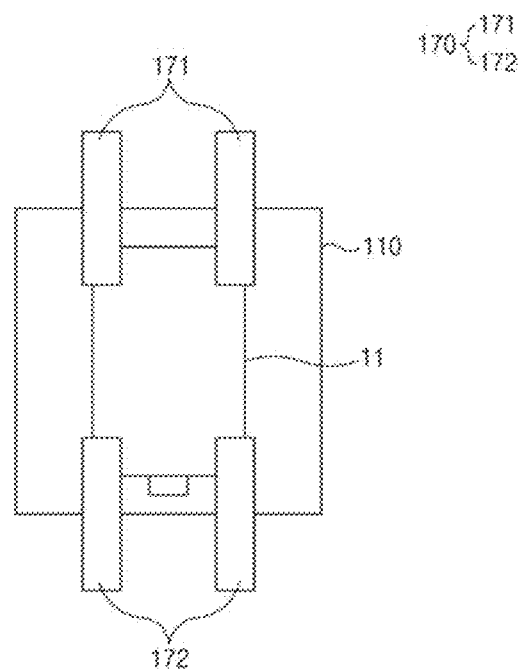
[FIG. 13]
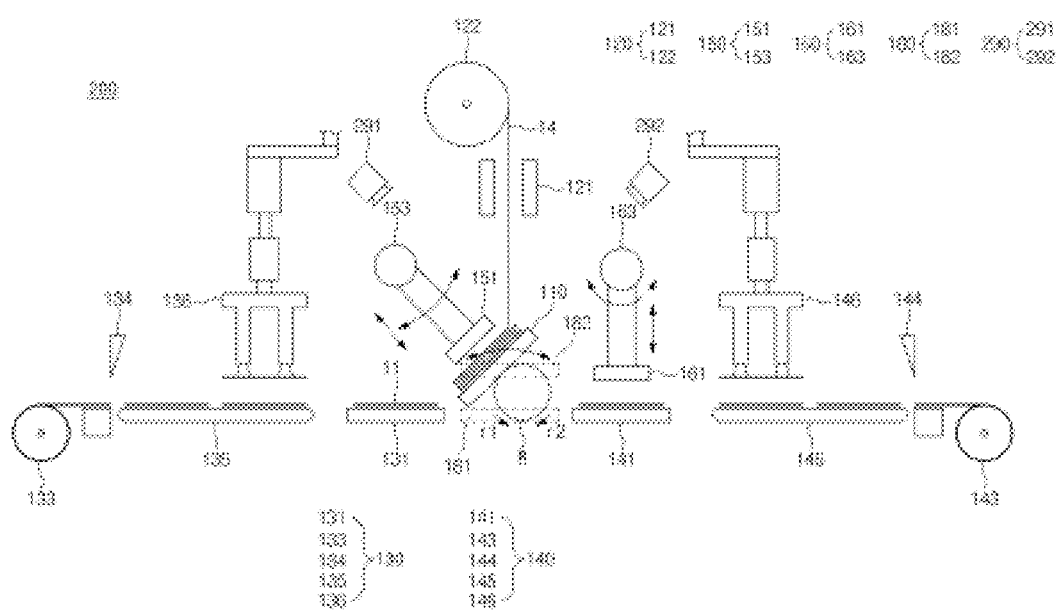

[FIG. 14]
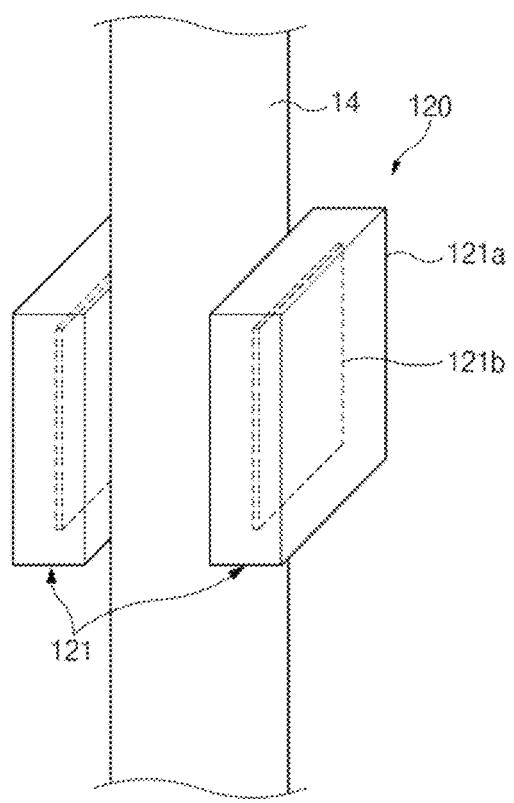

[FIG. 15A]
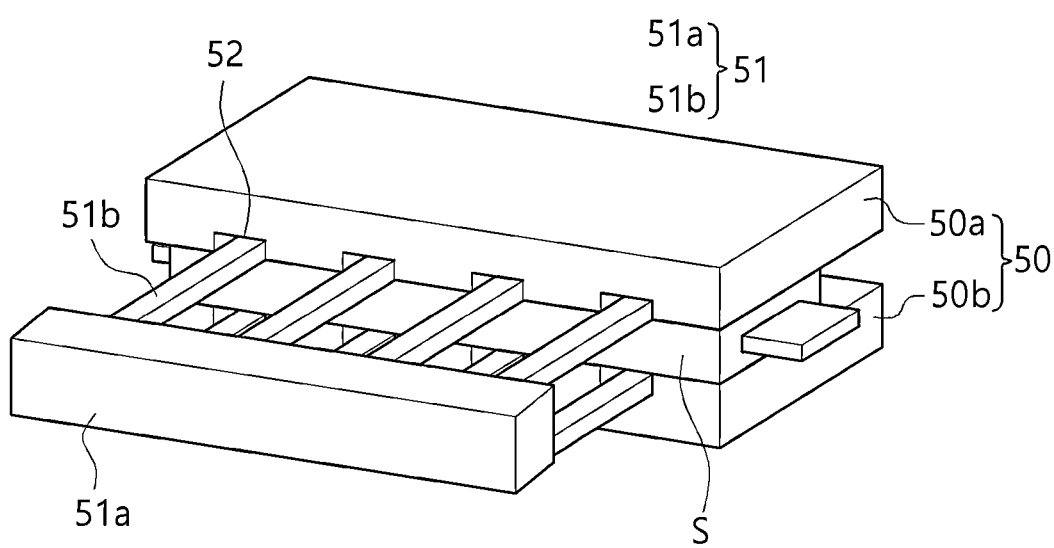
[FIG. 15B]
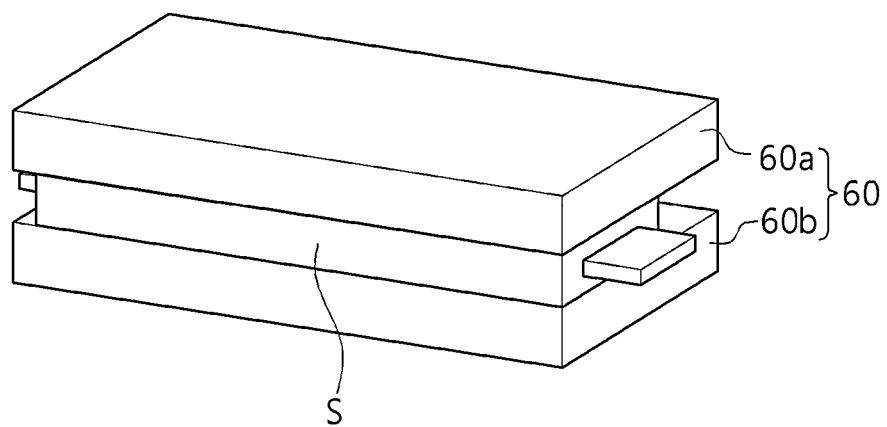

MANUFACTURING METHOD FOR ELECTRODE ASSEMBLY AND ELECTRODE ASSEMBLY MANUFACTURING EQUIPMENT

CROSS-REFERENCE TO RELATED APPLICATIONS

This application claims priority from Korean Patent Application No. 10-2021-0090596 filed on Jul. 9, 2021, Korean Patent Application No. 10-2021-0090588 filed on Jul. 9, 2021, Korean Patent Application No. 10-2021-0090589 filed on Jul. 9, 2021, Korean Patent Application No. 10-2021-0090590 filed on Jul. 9, 2021, Korean Patent Application No. 10-2021-0090591 filed on Jul. 9, 2021, Korean Patent Application No. 10-2021-0090592 filed on Jul. 9, 2021, Korean Patent Application No. 10-2021-0090597 filed on Jul. 9, 2021, Korean Patent Application No. 10-2021-0090598 filed on Jul. 9, 2021, Korean Patent Application No. 10-2021-0090600 filed on Jul. 9, 2021, and Korean Patent Application No. 10-2021-0090601 filed on Jul. 9, 2021, the entire contents of all of which are incorporated herein by reference.

FIELD OF THE INVENTION

The present invention relates to a method and an apparatus for manufacturing an electrode assembly.

BACKGROUND ART

Secondary batteries, unlike primary batteries, are rechargeable, and have been widely researched and developed in recent years due to their small size and large capacity. As technology development and demand for mobile devices increase, the demand for secondary batteries as an energy source is rapidly increasing.

Secondary batteries can be classified into a coin-type battery, a cylindrical battery, a prismatic battery, and a pouch-type battery, according to the shape of the battery case. In a secondary battery, an electrode assembly mounted inside a battery case is a chargeable/dischargeable power generating element having a stacked structure comprising electrodes and separators.

The electrode assembly may be generally classified into a jelly-roll type, a stack type, and a stack-and-folding type. In the jelly-roll type, a separator is interposed between a sheet type positive electrode and a sheet type negative electrode, each of which are coated with an active material, and the entire arrangement is wound. In the stack type, a plurality of positive and negative electrodes are sequentially stacked with a separator interposed therebetween. In a stack-and-folding type, stacked unit cells are wound with a long-length separation film.

In a stack-and-folding type electrode assembly, there has been a problem in that the position of the electrode is distorted from the form in which the separator is folded in a zigzag manner and the electrodes are positioned therebetween.

SUMMARY OF THE INVENTION

The present invention provides, among other things, a method and an apparatus for manufacturing an electrode assembly that prevents cell damage and deformation of mechanical parts in the process of manufacturing the electrode assembly, involving the stacking of electrodes with a separator.

The present invention also provides an apparatus for manufacturing an electrode assembly, which is capable of preventing the electrodes from being distorted during the manufacturing process.

An exemplary aspect of the present invention provides a method of manufacturing an electrode assembly. The method in accordance with such aspect of the invention preferably includes the steps of: assembling an electrode stack; then performing a primary heat press operation on the electrode stack; and then performing a secondary heat press operation on the electrode stack. The electrode stack assembled in the assembling step preferably includes a plurality of electrodes stacked along a stacking axis with a respective separator portion positioned between each of the electrodes. In the primary heat press operation, the electrode stack may be engaged with a gripper to secure a position of the electrode stack. Then, while the gripper is engaged with the electrode stack, heat and pressure may be applied to the electrode stack as part of the primary heat press operation. In the secondary heat press operation, the gripper may disengage the electrode stack, and then heat and pressure may be applied to the electrode stack as part of the secondary heat press operation. The secondary heat press operation preferably also includes applying heat and pressure to the electrode stack for a time period from 5 seconds to 60 seconds under a temperature condition from 50° C. to 90° C. and under a pressure condition from 1 Mpa to 6 Mpa.

In accordance with some aspects of the invention, the separator portions may be portions of an elongated separator sheet. In such aspects of the invention, the step of assembling the electrode stack may include alternately stacking a first one of the electrodes and a second one of the electrodes on the elongated separator sheet. Moreover, the elongated separator sheet may be sequentially folded over a previously-stacked one of the first and second electrodes before a subsequent one of the first and second electrode is stacked.

Another exemplary aspect of the present invention provides an apparatus for manufacturing an electrode assembly. Such electrode assembly may include an electrode stack having a plurality of first and second electrodes stacked along a stacking axis with a respective separator positioned between each of the first and second electrodes. The apparatus in accordance with this aspect of the invention preferably includes a press unit and a gripper. The press unit bonds together the electrodes and the separator portions within the electrode stack by applying heat and pressure to the electrode stack. The gripper engages the electrode stack to secure a position of the electrode stack when the heat and pressure is applied to the electrode stack by the press unit. The gripper and the press unit are desirably configured such that the press unit can apply heat and pressure to the electrode stack both while and the gripper is engaged with the electrode stack and also while the gripper is disengaged with the electrode stack.

In accordance with some aspects of the invention, the apparatus may further include: a stack table for supporting the electrode stack; a separator supply unit for supplying the separator to the stack table; a first electrode supply unit for supplying the first electrodes to the stack table; a second electrode supply unit for supplying the second electrodes to the stack table; a first electrode stack unit for moving the first electrodes supplied from the first electrode supply unit to the stack table; and a second electrode stack unit for moving the second electrodes supplied from the second electrode supply unit to the stack table.

In accordance with some other aspects of the invention, the apparatus may further include a rotating unit for rotating the stack table between a first position and a second position. Such first position may be oriented towards the first electrode stack unit for receiving the first electrodes from the first electrode stack unit, and the second position may be oriented towards the second electrode stack unit for receiving the second electrodes from the second electrode stack unit.

According to the present invention, by heating and pressing the entire stack with the press unit, the electrodes may be bonded to the separator without the need to individually heat and/or press each level of the electrode assembly (i.e., heating and/or pressing each electrode and separator pair at each step of the process). heating and stacking the electrode and the separator. As a result, it is beneficially possible to avoid the detrimental accumulation of heat and/or pressure in the lower separators in the stack, and thereby reduce the likelihood of damage and deformation of the components of the electrode assembly.

The invention may also beneficially reduce deviations in: adhesive force between the electrodes and separator, air permeability of the separator, and thickness of the manufactured electrode assembly, thereby resulting in increased uniformity.

By pressing the entire stacked stack with the press unit, the invention also desirably reduces any distortion or shifting of the positions of the electrodes in the electrode stack. Beneficially, that may result in reduced manufacturing time, as well as improved energy density of the manufactured electrode assembly.

BRIEF DESCRIPTION OF THE DRAWINGS

FIG. 1 is a diagram schematically illustrating a method of manufacturing an electrode assembly according to an exemplary embodiment of the present invention.

FIG. 2 is a top plan view illustrating an example of an apparatus for manufacturing an electrode assembly according to an exemplary embodiment of the present invention.

FIG. 3 is a front elevation view conceptually illustrating the apparatus for manufacturing the electrode assembly according to the exemplary embodiment of the present invention.

FIG. 4 is a cross-sectional view illustrating an electrode assembly manufactured by the apparatus for manufacturing the electrode assembly according to the exemplary embodiment of the present invention.

FIG. 5 is a perspective view illustrating a press unit in the apparatus for manufacturing the electrode assembly according to the exemplary embodiment of the present invention.

FIG. 6 is a perspective view illustrating an example of a state in which the press unit presses a stack in the apparatus for manufacturing the electrode assembly according to the exemplary embodiment of the present invention.

FIG. 7 is a perspective view illustrating a stack table in the apparatus for manufacturing the electrode assembly according to the exemplary embodiment of the present invention.

FIG. 8 is a perspective view illustrating a first electrode seating table in the apparatus for manufacturing the electrode assembly according to the exemplary embodiment of the present invention.

FIG. 9 is a perspective view illustrating a second electrode seating table in the apparatus for manufacturing the electrode assembly according to the exemplary embodiment of the present invention.

FIG. 10 is a perspective view illustrating a first suction head in the apparatus for manufacturing the electrode assembly according to the exemplary embodiment of the present invention.

FIG. 11 is a bottom view illustrating the first suction head of FIG. 10, according to the exemplary embodiment of the present invention.

FIG. 12 is a top plan view illustrating a holding mechanism and a stack table in the apparatus for manufacturing the electrode assembly according to the exemplary embodiment of the present invention.

FIG. 13 is a front elevation view conceptually illustrating an apparatus for manufacturing the electrode assembly according to another exemplary embodiment of the present invention.

FIG. 14 is a perspective view of a separator heating unit of a separator supply unit according to the exemplary embodiment of the present invention.

FIG. 15A is a perspective view illustrating a first press unit according to the exemplary embodiment of the present invention, and FIG. 15B is a perspective view illustrating a second press unit according to the exemplary embodiment of the present invention.

DETAILED DESCRIPTION

The objects, specific advantages, and novel features of the present invention will become more apparent from the following detailed description taken in conjunction with the accompanying drawings and exemplary embodiments. In the present specification, in adding reference numbers to the constituent elements of each drawing, it should be noted that the same constituent elements are given the same number even though they are indicated on different drawings. In addition, the present invention may be implemented in several different forms and is not limited to the exemplary embodiments described herein. Further, in describing the present invention, detailed descriptions of related known technologies that may unnecessarily obscure the gist of the present invention will be omitted.

According to an exemplary embodiment of the present invention, there may be provided a method of manufacturing an electrode assembly. The method may include: supplying a first electrode to a stack table; supplying a second electrode to the stack table; supplying a separator to the stack table; and assembling a stack on the stack table by alternately stacking the first electrode and the second electrode on the separator, where the separator is sequentially folded over a previously-stacked one of the first and second electrodes before a subsequent one of the first and second electrodes is stacked. After assembling the stack, the method may include performing a primary heat press operation comprising gripping the stack with a gripper and then heating and pressing the stack. After performing the primary heat press operation, the method may further include performing a secondary heat press operation comprising removing the gripper and then heating and pressing the stack. The secondary heat press operation may include pressing the stack for a time period from 5 seconds to 60 seconds under a temperature condition from 50° C. to 90° C. and under a pressure condition from 1 Mpa to 6 Mpa.

In an exemplary embodiment of the present invention, the primary heat press operation may include: fixing the stack by pressing an upper surface of the stack with the gripper; heating the stack table and/or a pair of pressing blocks; and pressing the stack between the pair of heated pressing blocks, or between a pressing block and the stack table (either or both of which may be heated).

In an exemplary embodiment of the present invention, each of the first electrode, the second electrode, and the separator may be supplied to the stack table while being heated. This means that before supplying the first electrode, the second electrode, and the separator to the stack table, heating may be performed by a commonly used method, as long as the first electrode, the second electrode, and the separator are not damaged by such heating.

In an exemplary embodiment of the present invention, the primary heat press operation may include heating and pressing the stack for a time period from 10 seconds to 30 seconds under a temperature condition from 65° C. to 90° C. and under a pressure condition from 1 Mpa to 3 Mpa. More preferably, the primary heat press operation may include heating and pressing the stack for a time period from 10 seconds to 20 seconds under a temperature condition from 65° C. to 75° C. and under a pressure condition from 1.5 Mpa to 2 Mpa.

In an exemplary embodiment of the present invention, the secondary heat press operation may include: ceasing the heating of the stack table and/or the pair of pressing blocks; ceasing the pressing of the stack; moving the gripper away from the stack; heating the stack table and/or the pair of pressing blocks to transfer heat to the stack; and pressing the stack between the pair of pressing blocks, or pressing the stack between a pressing block and the stack table (either or both of which may be heated).

In an exemplary embodiment of the present invention, the pair of pressing blocks may include a press heater for heating the pair of pressing blocks, so that the pair of pressing blocks may heat the stack. That is, in an exemplary embodiment of the present invention, the operation of heating and pressing the stack may include heating and pressing the stack with the pair of pressing blocks. In some exemplary embodiments of the invention, the stack table may also include a stack table heater for heating the body of the stack table so as to transfer heat to the stack.

In an alternative embodiment of the invention, one or both of the heat press operations may occur on the stack table. In such case, only one of the pressing blocks may be employed to press the top of the stack down against the stack table. In that case, the gripper may be a holding mechanism of the stack table, which may stabilize the stack by securing the position of the stack with respect to the stack table. Moreover, the holding mechanism may be configured to secure the stack in that manner at least during the primary heat press operation.

In the present specification, FIG. 1 is a diagram schematically illustrating a method of manufacturing an electrode assembly according to an exemplary embodiment of the present invention. That is, referring to FIG. 1, the method may first include a stack process of assembling a stack (stack cell) on a stack table by alternately stacking the first electrode and the second electrode on the separator, where the separator is sequentially folded over a previously-stacked one of the first and second electrodes before a subsequent one of the first and second electrodes is stacked. After the stack process, the stack may be moved away from the stack table. During such time, the separator is pulled, and, after the separator is pulled for a predetermined length, the separator is cut. Thereafter, the predetermined length of the cut end of the separator is wound around the stack cell. The movement of the stack away from the stack table may be accomplished by the gripper, which is desirably a movable component that can grip the stack on the stack table and then move the stack to the press unit, where the heat press operations are performed. The primary heat press operation is then performed in a state in which the wound stack cell is gripped with the gripper. After the primary heat press operation is completed, the grip of the stack cell by the gripper is released, and, after the gripper is removed, the secondary heat press operation is performed. When the secondary heat press operation is completed, the finished electrode assembly may be complete.

In the exemplary embodiment of the present invention, the temperature condition of the secondary heat press operation may be 50° C. or more, preferably 65° C. or more.

In the exemplary embodiment of the present invention, the temperature condition of the secondary heat press operation may be 90° C. or less, preferably 85° C. or less.

In the exemplary embodiment of the present invention, the temperature condition of the secondary heat press operation may be from 50° C. to 90° C., preferably from 65° C. to 90° C., more preferably from 65° C. to 85° C. Most preferably, the temperature condition of the secondary heat press operation may be 70° C.

In the exemplary embodiment of the present invention, the pressure condition of the secondary heat press operation may be 1 Mpa or more, preferably 1.5 Mpa or more, and more preferably 3 Mpa or more.

In the exemplary embodiment of the present invention, the pressure condition of the secondary heat press operation may be 6 Mpa or less, and preferably 5.5 Mpa or less.

In the exemplary embodiment of the present invention, the pressure condition of the secondary heat press operation may be from 1 Mpa to 6 Mpa, preferably from 1.5 Mpa to 6 Mpa, and more preferably from 3 Mpa to 5.5 Mpa.

In the exemplary embodiment of the present invention, the heating and pressing in the secondary heat press operation may be performed for 5 seconds or more, preferably 7 seconds or more.

In the exemplary embodiment of the present invention, the heating and pressing in the secondary heat press operation may be performed for 60 seconds or less, preferably 30 seconds or less, and more preferably 25 seconds or less.

In the exemplary embodiment of the present invention, the heating and pressing in the secondary heat press operation may be performed for a time period from 5 seconds to 60 seconds, preferably from 5 seconds to 30 seconds, more preferably from 7 seconds to 25 seconds.

In the exemplary embodiment of the present invention, the secondary heat press operation may involve heating and pressing the stack under a temperature condition of 50° C. to 90° C. and a pressure condition of 1 Mpa to 6 Mpa for 5 seconds to 60 seconds, preferably under a temperature condition of 65° C. to 90° C. and a pressure condition of 1.5 Mpa to 6 Mpa for 5 seconds to 30 seconds. More preferably, the secondary heat press operation may involve heating and pressing the stack under a temperature condition of 65° C. to 85° C. and a pressure condition of 3 Mpa to 5.5 Mpa for 7 seconds to 25 seconds. Here, the case where the temperature condition is 70° C. may be most preferable.

Here, the pressure condition of the primary heat press operation and the pressure condition of the secondary heat press operation mean the pressure applied by the pair of pressure blocks (or by a pressure block against the stack table), and the temperature condition means the temperature of heat applied by the stack table and/or the pair of pressing blocks. In addition, the pair of pressing blocks utilized for the primary heat press operation and the secondary heat press operation may be the same or different. That is, after pressing and heating the stack with the pair of pressing blocks during the primary heat press operation, in a state in which the stack is gripped with the gripper, the stack may later be pressed and heated by the same pair of pressing blocks or by a different pair of pressing blocks in the in the secondary heat press operation, in which the gripper is released.

In an alternative embodiment, in which at least one of the heat press operations occurs on the stack table, as discussed above, the primary heat press operation may involve one pressing block applying pressure to the stack seated on the stack table, where the stack is heated by either or both of heaters in the stack table and/or the pressing block. During such primary heat press operation, the stack may be secured to the stack table by a gripper in the form of a holding mechanism of the stack table. After the primary heat press operation, the gripper may be released from the stack, and then a secondary heat press operation can be performed with the gripper disengaged from the stack. Such secondary heat press operation may be performed on the stack table with pressure applied by the same or a different pressing block. Or, the stack may be moved to a separate press unit, where the secondary heat press operation may be performed by applying heat and pressure to the stack by a pair of press blocks of the press unit.

When the temperature, pressure, and time conditions disclosed herein are not satisfied, the components of the electrode assembly may not be properly adhered together, which can result in the electrode assembly falling apart or the components of the electrode assembly shifting their positions within the assembly, particularly when the electrode assembly is moved before being inserted into a battery case. A problem may also occur in which the air permeability of the separator is excessively high.

On the other hand, when the heat press operations disclosed herein are performed (including satisfying the respective pressure, temperature, and time conditions), an electrode assembly may be manufactured without the need to individually heat and/or press each level of the electrode assembly (i.e., heating and/or pressing each electrode and separator pair at each step of the process) in order to bond the components together. Such individual heat pressing at each level can detrimentally cause the effects of the heat and/or pressure to accumulate in the lower separators in the stack, since the already-stacked layers will experience the heat and/or pressure of each application. That can negatively impact such portions of separator by, for example, reducing porosity (and air permeability). In contrast, the present invention allows the entire electrode assembly to be simultaneously bonded, which improves uniformity, among other things. It is thus possible to simultaneously achieve both an appropriate level of adhesive force between the electrodes and also achieve a separator having an appropriate amount of air permeability, all while minimizing damage to the unit electrode.

In the exemplary embodiment of the present invention, the operation of manufacturing the stack by stacking the first electrode, the separator, and the second electrode on the stack table includes: stacking the separator on the stack table (S1); stacking the first electrode on the upper surface of the separator (S2); supplying the separator while rotating the stack table to cover an upper surface of the first electrode (S3); and stacking the second electrode on a portion of the separator covering the upper surface of the first electrode (S4); and the operations of S1 to S4 may be repeated one or more times. By repeating the foregoing operations one or more times, zig zag folding is possible in such a way that the separator becomes positioned between each of the first and second electrodes.

In the exemplary embodiment of the present invention, the stack comprising the separator and at least one each of the first and second electrodes may be held with the holding mechanism and thereby fixed to the stack table. The holding mechanism may also be referred to as a gripper.

In the exemplary embodiment of the present invention, the method may further include holding the first electrode or the second electrode by using the holding mechanism and fixing the first electrode or the second electrode to the stack table when the first electrode or the second electrode is stacked on the stack table. By doing this, it is possible to prevent the position of the electrodes from shifting in the electrode assembly.

In this case, the holding mechanism may press and fix the upper surface of the stack (i.e., the upper surface of the first or second electrode or the separator stacked on the uppermost side of the stack) when stacked on the stack table.

In the exemplary embodiment of the present invention, the operation of supplying the separator to the stack table may include continuously supplying (by unwinding) the separator while the separator passes through a passage of the separator supply unit.

In the exemplary embodiment of the present invention, the method may further include inspecting a stacking quality of the first electrode or the second electrode using image information obtained through camera photography before stacking the first electrode or the second electrode.

In the exemplary embodiment of the present invention, it is possible to provide an electrode assembly manufactured by the above-described manufacturing method. The electrode assembly has uniform adhesive force and air permeability across all layers of the assembly, and the thickness of each electrode is uniform. That is, any deviation in adhesive force, air permeability, and thickness of the electrodes is minimized across the electrode assembly.

In an exemplary embodiment of the present invention, it is possible to provide an apparatus for manufacturing an electrode assembly by the above-described manufacturing method. Such apparatus includes: a stack table in which the first electrode, the separator, and the second electrode are stacked as disclosed herein; a separator supply unit for supplying the separator to the stack table; a first electrode supply unit for supplying the first electrode; a second electrode supply unit for supplying the second electrode; a first electrode stack unit for stacking the first electrode supplied from the first electrode supply unit on the stack table; a second electrode stack unit for stacking the second electrode supplied from the second electrode supply unit on the stack table; a press unit for bonding the first electrode, the separator, and the second electrode by heating and pressing a stack comprising the first electrode, the separator, and the second electrode; and a gripper for gripping the stack so as to fix the stack when being heated and pressed by the press unit, wherein the press unit performs a primary heat press operation by heating and pressing the stack while the stack is gripped by the gripper, and wherein, while the stack is not gripped by the gripper, the press unit performs a secondary heat press operation by pressing the stack for 5 seconds to 60 seconds under a temperature condition of 50° C. to 90° C. and a pressure condition of 1 Mpa to 6 Mpa.

In the exemplary embodiment of the present invention, the press unit may further include a pair of pressing blocks and a press heater for heating the pressing blocks, and the pair of pressing blocks are configured to be moved towards one another to heat and press the stacked stack. As for the pressing block and press heater constituting the press unit, the foregoing description in the method of manufacturing the electrode assembly may be applied.

In the exemplary embodiment of the present invention, the first electrode supply unit includes a first electrode seating table on which the first electrode is seated before being stacked on the stack table by the first electrode stack unit, and the second electrode supply unit may include a second electrode seating table on which the second electrode is seated before being stacked on the stack table by the second electrode stack unit.

In addition, the first electrode stack unit may include a first suction head for picking up the first electrode seated on the first electrode seating table using vacuum suction, and the second electrode stack unit may similarly include a second suction head for picking up the second electrode seated on the second electrode seating table using vacuum suction.

In the exemplary embodiment of the present invention, the first electrode supply unit and the second electrode supply unit may include a heater. Each of the first electrode and the second electrode may be supplied while being heated by the heater.

More particularly, in the exemplary embodiment of the present invention, the first electrode seating table may include a heater that may heat the first electrode seating table so as to transfer heat the first electrode.

Further, in the exemplary embodiment of the present invention, the second electrode seating table may include a heater that may heat the second electrode seating table so as to transfer heat the second electrode.

In the exemplary embodiment of the present invention, the first suction head may include a heater to heat the first electrode by using the heater.

In the exemplary embodiment of the present invention, the second suction head may include a heater to heat the second electrode by using the heater.

In the exemplary embodiment of the present invention, the apparatus for manufacturing the electrode assembly may further include a rotating unit for rotating the stack table, where the first electrode stack unit is provided on one side of the rotating unit and the second electrode stack unit is provided on the other side of the rotating unit. In that manner, zigzag folding is possible by positioning the separator between the first electrode and the second electrode, and the rotating unit alternately rotates the stack table to one side to face the first suction head of the first electrode stack unit when the first electrode is stacked, and then rotates the stack table to the other side to face the second suction head of the second electrode stack unit when the second electrode is stacked.

In the exemplary embodiment of the present invention, the holding mechanism may apply some pressure to fix an upper surface of the electrode or separator positioned on the uppermost side of the stack stacked on the stack table.

In the present invention, a method for measuring adhesive force of the separator is not particularly limited. In the method utilized and discussed further herein, a lower portion, a middle portion, and an upper portion of the electrode assembly were separated along the stacking direction of the electrode assembly, and samples were made of each of a positive electrode tab part, a middle part, and a negative electrode tab part in the width direction of the electrode assembly. The samples had a width of 55 mm and a length of 20 mm, and each sample may include a positive electrode and a separator or a negative electrode and a separator. The sample was adhered to a slide glass, with the electrode being positioned on the adhesive surface of the slide glass.

More specifically, the slide glass with the sample adhered thereto was mounted to an adhesive force measuring device, and values for force per sample width (in grams/mm) were measured when the separator was peeled away from the electrode according to the standard testing method set forth in ASTM-D6862. Specifically, an edge of the separator was pulled upwardly at 90° relative to the slide glass at a speed of 100 mm/min so as to peel the separator away from the electrode along the width direction of the sample (i.e., peeling from 0 mm to 55 mm).

In the present invention, the method for measuring the air permeability of the separator is not particularly limited. In the method utilized and discussed further herein, the air permeability was measured by using a method commonly used in the art, namely, according to the JIS Gurley measurement method of the Japanese industrial standard using a Gurley type Densometer (No. 158) manufactured by Toyo-seiki. That is, the air permeability of the separator was obtained by measuring the time it takes for 100 ml (or 100 cc) of air to pass through the separator of 1 square inch under a pressure of 0.05 MPa at room temperature.

FIG. 2 is a top plan view illustrating an example of the apparatus for manufacturing the electrode assembly according to the exemplary embodiment of the present invention, and FIG. 3 is a front elevation view conceptually illustrating the apparatus for manufacturing the electrode assembly according to the exemplary embodiment of the present invention. Here, for convenience, in FIG. 2, the separator supply unit 120 illustrated in FIG. 3 is omitted, and in FIG. 3, the holding mechanism 170 illustrated in FIG. 2 is omitted, and the press unit 180 located on the rear side in a top plan view is illustrated with dotted lines.

Referring to FIGS. 2 and 3, an apparatus 100 for manufacturing an electrode assembly according to an exemplary embodiment of the present invention includes a stack table 110; a separator supply unit 120 for supplying a separator 14; a first electrode supply unit 130 for supplying a first electrode 11; a second electrode supply unit 140 for supplying a second electrode 12; a first electrode stack unit 150 for stacking the first electrode 11 on the stack table 110; a second electrode stack unit 160 for stacking the second electrode 12 on the stack table 110; and a press unit 180 for bonding the first electrode 11, the separator 14, and the second electrode 12 to each other. The press unit 180 may be used in both the primary and secondary heat press operations described above. Alternatively, after completing the primary heat press operation with the press unit 180, the secondary heat press operation may be performed by another press unit (not illustrated), which would involve a transfer between the press units.

Further, the apparatus 100 for manufacturing the electrode assembly according to the exemplary embodiment of the present invention may further include a holding mechanism 170 for fixing the first electrode 11 and the second electrode 12 to the stack table 110 when the first electrode 11 and the second electrode 12 are stacked on the stack table 110. In addition, the holding mechanism 170 may fix a stack of the first electrode(s) 11, the separator 14, and the second electrode(s) 12.

Hereinafter, the apparatus for manufacturing the electrode assembly according to the exemplary embodiment of the present invention will be described in more detail with reference to FIGS. 2 to 12.

FIG. 4 is a cross-sectional view illustrating an electrode assembly manufactured by the apparatus for manufacturing the electrode assembly according to the exemplary embodiment of the present invention.

Referring to FIGS. 2 to 4, the apparatus 100 for manufacturing the electrode assembly according to the exemplary embodiment of the present invention is an apparatus for manufacturing an electrode assembly 10 by stacking the first electrode 11, the separator 14, and the second electrode 12.

The electrode assembly 10 is a chargeable/dischargeable power generating element, and may be formed in a form in which the first electrode 11, the separator 14, and the second electrode 12 are alternately stacked and aggregated.

Here, in the electrode assembly 10, for example, the separator 14 may be folded in a zigzag shape, and the first electrode 11 and the second electrode 12 may be alternately disposed between the folded separators 14. In this case, the electrode assembly 10 may be provided in a form in which the outermost portion is surrounded by the separator 14, e.g., by wrapping the separator around the assembled electrode assembly 10, as illustrated in FIG. 4.

FIG. 5 is a perspective view illustrating the press unit in the apparatus for manufacturing the electrode assembly according to the exemplary embodiment of the present invention, and FIG. 6 is a perspective view illustrating an example of a state in which the press unit presses a stack in the apparatus for manufacturing the electrode assembly according to the exemplary embodiment of the present invention. More specifically, FIG. 6 illustrates the above-described secondary heat press operation.

Referring to FIGS. 4 to 6, the press unit 180 is heated and presses the stacked first electrode(s) 11, separator 14, and second electrode(s) 12 to bond the first electrode(s) 11, the separator 14, and the second electrode(s) 12 to one another.

Further, the press unit 180 includes a pair of pressing blocks 181 and 182, and the pair of pressing blocks 181 and 182 are moved towards one another to effect the pressing of the stack S comprising the stacked first electrode(s) 11, the separator 14, and the second electrode(s) 12.

In this case, when the separator 14 surrounds the outer surface of the stack S, the space between the outer portion of the separator 14 positioned along the sides of the stack S and the portions of the first and second electrodes 11 and 12 and the folded portions of the separator 14 facing the outer portion may be bonded to one another. Accordingly, it is possible to more effectively prevent the positions of the first and second electrodes 11 and 12 and the separator 14 from being displaced and/or the components of the stack from separating from one another.

In addition, the press unit 180 further includes press heaters 183 and 184 for heating the pair of pressing blocks 181 and 182, and the pair of pressing blocks 181 and 182 may heat and press the stack S. Accordingly, when the stack S is pressed with the press unit 180, thermal fusion between the first electrode(s) 11, the separator 14, and the second electrode(s) 12 is better achieved, such that stronger adhesion may be possible.

The pair of pressing blocks 181 and 182 has a flat pressing surface, and the width and length dimensions of the pressing surface may be longer than the confronting width and length dimensions of the stack S.

In addition, the pair of pressing blocks 181 and 182 includes a first pressing block 181 and a second pressing block 182, and the first pressing block 181 and the second pressing block 182 each define a quadrangular block having a rectangular parallelepiped form.

FIG. 7 is a perspective view illustrating the stack table in the apparatus for manufacturing the electrode assembly according to the exemplary embodiment of the present invention.

Referring to FIGS. 3 and 7, the stack table 110 may include a table body 111 on which the first electrode 11, the separator 14, and the second electrode 12 are stacked, and a stack table heater 112 which heats the table body 111 to transfer heat to the stacked stack S.

The first electrode 11 may be configured as a positive electrode, and the second electrode 12 may be configured as a negative electrode, but the present invention is not necessarily limited thereto. For example, the first electrode 11 may be configured as a negative electrode and the second electrode 12 may be configured as a positive electrode.

Referring to FIG. 3, the separator supply unit 120 may supply the separator 14 to the stack table 110.

The separator supply unit 120 may have a passage through which the separator 14 passes towards the stack table 110. In particular, the separator supply unit 120 may include a separator heating unit 121 defining the passage through which the separator 14 passes towards the stack table 110. As shown in FIG. 14, the separator heating unit 121 may include a pair of bodies 121a, each of which may be in the form of a square block, and the bodies 121a may be spaced apart by a distance defining one of the dimensions of the passage through which the separator 14 passes. At least one or both of the bodies 121a may further include a separator heater 121b for heating the respective body 121a, and thereby transferring heat to the separator 14.

The separator supply unit 120 may further include a separator roll 122 on which the separator 14 is wound. Thus, the separator 14 wound on the separator roll 122 may be gradually unwound and pass through the formed passage to be supplied to the stack table 110.

FIG. 8 is a perspective view illustrating a first electrode seating table in the apparatus for manufacturing the electrode assembly according to the exemplary embodiment of the present invention.

Referring to FIGS. 3 and 8, the first electrode supply unit 130 may supply the first electrode 11 to the first electrode stack unit 150. In addition, the first electrode supply unit 130 may include a first electrode seating table 131 on which the first electrode 11 is seated before being stacked on the stack table 110 by the first electrode stack unit 150.

The first electrode supply unit 130 may further include a first electrode roll 133 on which the first electrode 11 is wound in the form of a sheet, a first cutter 134 for cutting the first electrode 11 at regular intervals to form the first electrodes 11 of a predetermined size when the first electrode 11 is unwound and supplied from the first electrode roll 133, a first conveyor belt 135 for moving the first electrode 11 cut by the first cutter 134, and a first electrode supply head 136 for picking up (e.g., via vacuum suction) the first electrode 11 transferred by the first conveyor belt 135 and seating the first electrode on the first electrode seating table 131. Here, the first cutter 134 may cut the sheet-shaped first electrode 11 in such a way as to define a first electrode tab 11a protruding from the end thereof.

FIG. 9 is a perspective view illustrating a second electrode seating table in the apparatus for manufacturing the electrode assembly according to the exemplary embodiment of the present invention.

Referring to FIGS. 3 and 9, the second electrode supply unit 140 may supply the second electrode 12 to the second electrode stack unit 160. In addition, the second electrode supply unit 140 may include a second electrode seating table 141 on which the second electrode 12 is seated before being stacked on the stack table 110 by the second electrode stack unit 160.

The second electrode supply unit 140 may further include a second electrode roll 143 on which the second electrode 12 is wound in the form of a sheet, a second cutter 144 for cutting the second electrode 12 at regular intervals to form the second electrode 12 of a predetermined size when the second electrode 12 is unwound and supplied from the second electrode roll 143, a second conveyor belt 145 for moving the second electrode 121 cut by the second cutter 144, and a second electrode supply head 146 for picking up (e.g., via vacuum suction) the second electrode 12 transferred by the second conveyor belt 145 and seating the second electrode on the second electrode seating table 141. Here, the second cutter 144 may cut the sheet-shaped second electrode 12 in such a way as to define a second electrode tab 12a protruding from the end thereof.

FIG. 10 is a perspective view illustrating a first suction head in the apparatus for manufacturing the electrode assembly according to the exemplary embodiment of the present invention, and FIG. 11 is a bottom view illustrating the first suction head in the apparatus for manufacturing the electrode assembly according to the exemplary embodiment of the present invention.

Referring to FIGS. 3, 10, and 11, the first electrode stack unit 150 may stack the first electrode 11 on the stack table 110. The first electrode stack unit 150 may include a first suction head 151 and a first moving unit 153. The first suction head 151 may pick up the first electrode 11 seated on the first electrode seating table 131 via vacuum suction. In this case, the first suction head 151 may be formed with one or more vacuum suction ports 151a formed on a bottom surface 151b of the first suction head 150 in order to apply suction to the first electrode 11 and thereby secure the first electrode 11 to the bottom surface 151b of the first suction head 151. In the first suction head 151, a passage connecting the vacuum suction port 151a and a device for generating vacuum suction (not illustrated) may be formed.

The first moving unit 153 may move the first suction head 151 to the stack table 110 so as to allow the first suction head 151 to stack the first electrode 11 on the stack table 110.

Meanwhile, referring to FIG. 3, the second electrode stack unit 160 may stack the second electrode 12 on the stack table 110. The second electrode stack unit 160 may have the same structure as that of the foregoing first electrode stack unit 150. In such case, the second electrode stack unit 160 may include a second suction head 161 and a second moving unit 163. The second suction head 161 may pick up the second electrode 12 seated on the second electrode seating table 141 via vacuum suction. The second moving unit 163 may then move the second suction head 161 to the stack table 110 so as to allow the second suction head 161 to stack the second electrode 12 on the stack table 110.

FIG. 12 is a top plan view illustrating the holding mechanism and the stack table in the apparatus for manufacturing the electrode assembly according to the exemplary embodiment of the present invention.

Referring to FIGS. 2 and 12, when the first electrode 11 or the second electrode 12 is stacked on the stack table 110, the holding mechanism 170 may hold the first electrode 11 or the second electrode 12 and secure the first electrode 11 or the second electrode 12 to the stack table 110. In doing so, the holding mechanism 170 may apply pressure to the upper surface of the stack S (i.e., the first electrode 11, the second electrode 12, or the separator 14 stacked on the uppermost end of the stack S). That is, when the first electrode(s) 11 and the second electrode(s) 12 are positioned in a stack S between layers of the separator 14, the holding mechanism 170 may hold the uppermost surface of the stack by pressing the stack towards the stack table 110 to prevent movement of the stack S with respect to the stack table 110. The holding mechanism 170 may include, for example, a first holder 171 and a second holder 172 to fix opposing sides of the first electrode 11 or the second electrode 12. The holders 171, 172 may each be in the form of one or more clamps or other clamping mechanisms.

When the stack table 110 is rotated, while the holding mechanism 170 maintains its hold on the first electrode 11 or the second electrode 12, the separator 14 may be supplied to the stack table 110 while being unwound from the separator roll 122 in proportion to the rotation amount of the stack table 110. The holding mechanism 170 and the stack table 110 may be connected or combined with the rotating device (not illustrated) that effects rotation of the stack table 110. Such rotating device may include, for example, a mandrel or other form of rotating or pivoting shaft. Thus, when the holding mechanism 170 holds the first electrode 11 or the second electrode 12, the rotating device may rotate the holding mechanism 170 with the stack table 110.

Hereinafter, the operation of the apparatus 100 for manufacturing the electrode assembly according to the exemplary embodiment of the present invention will be described.

Referring to FIGS. 2 to 4, the separator 14 wound on the separator roll 122 is supplied while passing through the passage formed so that the separator can be stacked on the stack table 110.

Further, when the first electrode 11 is supplied from the first electrode supply unit 130 to the first electrode stack unit 150, the first electrode stack unit 150 stacks the first electrode 11 on the upper surface of the separator 14 stacked on the stack table 110.

The holding mechanism 170 then presses down on the upper surface of the first electrode 11 to secure the position of the first electrode 11 on the stack table 110.

Thereafter, when the stack table 110 is rotated in the direction of the second electrode stack unit 160, the separator 14 is continuously supplied so as to cover the upper surface of the first electrode 11.

The second electrode 12 supplied from the second electrode supply unit 140 is then stacked by the second electrode stack unit 160 on a portion of the separator 14 where the separator 14 covers the upper surface of the first electrode 11. Then the holding mechanism 170 releases the upper surface of the first electrode 11 and then presses down on the upper surface of the second electrode 12 to secure the position of the stack S being built vis-a-vis the stack table 110.

Thereafter, by repeating the process of stacking the first electrode 11 and the second electrode 12, the stack S in which the separator 14 is zig-zag-folded and positioned between each of the successive first and second electrodes 11, 12 may be formed.

Then, the stack S is moved to the press unit 180, and the press unit 180 heats and presses the stack S, thus thermally bonding the components of the stack together (i.e., the heated first electrode(s) 11, separator 14, and second electrode(s) 12) so as to manufacture the electrode assembly 10.

The stack S may be moved to the press unit by a gripper 51 that is configured to grip the stack on the stack table 110 and then move the stack to the press unit 180, where the heat press operations are performed. Moreover, the press unit 180 may be divided into a first press unit 50 and a second press unit 60, where the first press unit 50 can be used for the primary heat press operation (or pre-heating), and the second press unit 60 can be used for the secondary heat press operation.

Referring to FIGS. 15A and 15B, the first press unit 50 may primarily heat and press the stack S in a fixed state. The first press unit 50 includes a pair of first pressing blocks 50a and 50b and may further include the gripper 51 configured for fixing the stack S. In fixing the stack S, the gripper 51 may hold the stack S by pressing the upper and lower surfaces of the stack S towards one another along the stacking direction (along the y axis) to fix the relative positions of the first electrodes 11, the second electrodes 12, and the separator 14. As in the example shown, to hold these relative positions, the gripper 51 may press the upper and lower surfaces of the stack S.

The pair of first pressing blocks 50a and 50b of the first press unit 50 may move in directions towards and away from each other. In moving towards each other, the pair of first pressing blocks 50a and 50b may compress either one or both of the stack S and the gripper 51.

In this manner, the first press unit 50 may heat and compress the stack S to reduce or eliminate any spaces between the first electrodes 11, the separator 14, and the second electrodes 12 included in the stack S, so as to bond such components of the stack S together.

As shown, each pressing surface of the pair of first pressing blocks 50a and 50b configured for contact with and compression of the stack S may define planes. At least one of the pair of first pressing blocks 50a and 50b may include a gripper groove 52 having a shape corresponding to a fixing part 51b of the gripper 51 described further herein. In the example shown in FIG. 15A, each of the pair of first pressing blocks 50a and 50b include four gripper grooves 52 to correspond with four fixing parts 51b. However, there may be a greater or fewer number of gripper grooves 52. Preferably, the number of gripper grooves 52 should match the number of fixing parts to be used.

The gripper 51 may include a main body 51a and a plurality of fixing parts 51b. As in the arrangement shown, the main body 51a may have a length along an x axis and a height along a y axis that are the same or approximately the same as the length and height of the stack S along those respective axes. In some other arrangements, the main body may be longer than the length of the stack S in the x axis and have a greater height than the height of the stack S in the y axis. The fixing parts 51b preferably may be in the form of a rod, column, or plate that extend along a width direction (z axis) of the stack S. Here, the length of the stack S in the x axis may refer to the portion of the stack having the longest distance from one end to the other end of the stack S, and the height in the y axis may refer to the distance in the stacking direction of the stack S, and the width in the z axis may refer to a distance in a direction perpendicular to both the x and y axes.

The fixing parts 51b may be provided in two rows in which one row is adjacent to a pressing surface of pressing block 50a while the other row is adjacent to a pressing surface of pressing block 50b. The position of each of the fixing parts 51b may be adjustable in the height direction of the main body 51a. In this manner, each of the fixing parts 51b may be placed in contact with, and preferably along the width of, the upper and lower surfaces of the stack S to fix the position of the stack S and the relative positions of the first electrode 11 and the second electrode 12 within the stack S.

In some arrangements, the second press unit 60 may heat and compress the stack S that was previously heated and compressed by the first press unit 50, so as to secondarily compress the already primarily compressed stack S.

As shown in FIG. 15B, the second press unit 60 includes a pair of second pressing blocks 60a and 60b. The pair of pressing blocks 60a and 60b may be moved in directions towards and away from each other. In moving towards each other, the pair of pressing blocks 60a and 60b may press upon the upper and lower surfaces of the stack S to compress the stack.

As shown, each pressing surface of the pair of second pressing blocks 60a and 60b configured for contact with and compression of the stack S may define planes. As in the example shown, in some arrangements, grooves for the fixing parts 51b may be excluded from the second pressing blocks 60a and 60b. In some other arrangements, at least one of the pair of second pressing blocks 60a and 60b may include one or more grooves having a shape corresponding to the fixing part 51b of the gripper 51.

In some arrangements, each of the pair of first pressing blocks 50a and 50b of the first press unit 50 include gripper grooves 52 having a shape corresponding to the fixing part 51b of the gripper 51, and each of the pair of second pressing blocks 60a and 60b of the second press unit 60 have flat pressing surfaces without any gripper grooves.

In some arrangements, the second press unit 60 may heat and press only a portion of the stack S on which the gripper 51 is (or was previously) located, which were not heated and pressed by the first press unit 50. In some other arrangements, the second press unit 50 may heat and press the entire upper and lower surfaces of the stack.

In some arrangements, the first press unit 50 may compress the heated stack S initially and with the upper surface and the lower surface of the stack S fixed with the gripper 51 to reduce or eliminate the spaces between, while bonding, the first electrodes 11, the separator 14, and the second electrodes 2 included in the stack S, so as to bond such components of the stack S together in the regions of the stack S in which the gripper 51 is not located.

In some such arrangements, the second press unit 60 may compress and heat the stack S which has already been preliminarily bonded by the first press unit 50, and from which the gripper 51 has been removed. The second press unit 60 may thus reduce or eliminate any spaces between the first electrodes 11, the separator 4, and the second electrodes 12 included in the stack S, so as to bond such components of the stack S together in the regions of the stack S in which the gripper 51 previously pressed the stack S during the initial pressing operation by the first press unit 50. In some such arrangements, each of the pair of second pressing blocks 60a and 60b may be a quadrangular block in the form of a rectangular parallelepiped. In such arrangements, the pair of second pressing blocks 60a and 60b may have the flat pressing surfaces described previously herein.

In some arrangements, each of the pair of first pressing blocks 50a and 50b of the first press unit 50 may have the flat pressing surfaces. In some such arrangements, each of the pair of second pressing blocks 60a and 60b of the second press unit 60 may have grooves having the shape corresponding to the fixing parts 51b of the gripper 51.

In some arrangements, the fixing part 51b may include a heat-conducting material, such as a thermally conductive metal material selected from the group consisting of aluminum and iron. By conducting heat to the stack S, when the first press unit 50 compresses the stack S fixed by the gripper 51, the electrodes 11, 12, and separator 4 may be bonded together as the spaces between them are reduced or eliminated.

In some arrangements, the second press unit 60 may not compress regions of the stack S on which the gripper 51 was previously located, but may instead only compress regions of the stack S where the gripper was not previously located and upon which the press unit 50 did not press during the initial pressing.

Further, each of the pair of first pressing blocks 50a and 50b may be a quadrangular block in the form of a rectangular parallelepiped. In such arrangements, the pair of first pressing blocks 50a and 50b may have the flat pressing surfaces described previously herein.

Either one or both of the first and second press units 50 and 60 preferably include a press heater (not illustrated), configured for heating the respective pair of first and second pressing blocks 50a, 50b, 60a, and 60b such that the blocks may heat the stack S when pressing upon the stack. In this manner, when the stack S is pressed with the first and second press units 50 and 60, thermal fusion between the first electrodes 11, the separator 14, and the second electrodes 12 may be better achieved such that stronger bond may be formed among these layers.

In any one or more of the pairs of first and second pressing blocks 50a, 50b, 60a, and 60b, both the length and the width of the respective pressing surfaces may be greater than the corresponding length and width (in the x and z axes, respectively) of the stack S.

The apparatus 100 for manufacturing the electrode assembly according to the exemplary embodiment of the present invention configured as described above, by thermally bonding the components of the stack S to one another, may desirably prevent the stack S from falling apart or the components of the stack S from shifting their positions within the stack S.

Hereinafter, an apparatus for manufacturing an electrode assembly according to another embodiment of the present invention will be described.

FIG. 13 is a front elevation view conceptually illustrating an apparatus for manufacturing an electrode assembly according to another exemplary embodiment of the present invention. In FIG. 13, the holding mechanism is omitted for convenience, and the press unit 180 located on the rear side in a top plan view is illustrated with dotted lines.

Referring to FIG. 13, an apparatus 200 for manufacturing an electrode assembly according to another exemplary embodiment of the present invention includes a stack table 110; a separator supply unit 120 for supplying a separator 14; a first electrode supply unit 130 for supplying a first electrode 11; a second electrode supply unit 140 for supplying a second electrode 12; a first electrode stack unit 150 for stacking the first electrode 11 on the stack table 110; a second electrode stack unit 160 for stacking the second electrode 12 on the stack table 110; a press unit 180 for bonding the first electrode 11, the separator 14, and the second electrode 12 to each other; and a holding mechanism 170 for securing the positions of the stack S on the stack table 110 (see FIG. 12).

The apparatus 200 according to this other embodiment may further include a rotating unit R for rotating the stack table 110 and a vision device 290 for inspecting the first and second electrodes 11 and 12.

Accordingly, in the present exemplary embodiment, content overlapping with the prior embodiment will be briefly described, while differences from that prior embodiment will be primarily described.

In more detail, the vision device 290 of the apparatus 200 may include a first camera 291 and a second camera 292. The first camera 291 may photograph the first electrode 11 seated on the first electrode seating table 131 in the first electrode supply unit 130, and the second camera 292 may photograph the second electrode 12 seated on the second electrode seating table 141 in the second electrode supply unit 140. The stacking quality of the first electrode 11 and the second electrode 12 may thereby be inspected through image information obtained by the first camera 291 and the second camera 292. For example, the seating positions, sizes, and stacking states of the first electrode 11 and the second electrode 12 may thus be inspected.

The rotating unit R may rotate the stack table 110 in one direction r1 and the other direction r2. A first electrode stack unit 150 may be provided on one side of the rotating unit R, and the second electrode stack unit 160 may be provided on the other side of the rotating unit R. The rotating unit R may thus rotate the stack table 110 to one side so as to face a first suction head 151 when the first electrode 11 is stacked, and may rotate the stack table 110 to the other side so as to face a second suction head 161 when the second electrode 12 is stacked. By alternately rotating the stack table 110 between the orientations facing the first electrode stack unit 150 and the second electrode stack unit 160, the zig zag folding of the separator 14 between each successive one of the first and second electrodes 11, 12, as shown in FIG. 4, may thus be achieved.

The apparatus 200 of the present embodiment and all of its subcomponents operates in the same manner as the apparatus 100 of the previously-described embodiment, except as otherwise stated. For example, when the first electrode 11 is supplied and seated on the first electrode seating table 131 of the first electrode supply unit 130, the stacking quality of the first electrode 11 may be inspected via the vision device 290. Similarly, when the second electrode 12 is supplied and seated on the second electrode seating table 141 of the second electrode supply unit 140, the stacking quality of the second electrode 12 may be inspected via the vision device 290.

In some arrangements of the present invention, the positive electrode may be manufactured by, for example, coating a positive electrode current collector with a positive electrode coating mixture comprising a positive electrode active material, a conductive material, and a binder and then drying the coating mixture. If necessary, a filler may be added to the mixture. Such materials may be any appropriate materials used in the relevant field, in particular those commonly used for the particular application.

For example, the positive electrode active material may include: layered compounds, such as lithium cobalt oxide ($LiCoO_2$) and lithium nickel oxide ($LiNiO_2$), or compounds substituted with one or more transition metals; lithium manganese oxides represented by the chemical formula $Li_{1+x}Mn_{2-x}O_4$ (where x is 0 to 0.33), such as $LiMnO_3$, $LiMn_2O_3$, and $LiMnO_2$; lithium copper oxide ($Li_2CuO_2$); vanadium oxides, such as $LiV_3O_8$, $LiFe_3O_4$, $V_2O_5$, and $Cu_2V_2O_7$; Nickel (Ni) site-type lithium nickel oxide represented by the chemical formula $LiNi_{1-x}M_xO_2$ (wherein M=Co, Mn, Al, Cu, Fe, Mg, B or Ga, and x=0.01 to 0.3); lithium manganese composite oxides represented by the chemical formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$, but the present invention is not limited to such materials.

The materials that may be used for the positive electrode current collector is not particularly limited. The positive electrode current collector preferably has a relatively high conductivity without causing a chemical change when used in a battery. For example, stainless steel; aluminum; nickel; titanium; calcined carbon; or a material in which a surface of aluminum or stainless steel is treated with carbon, nickel, titanium, silver, and the like may be used. Preferably, the positive electrode current collector may be aluminum. Adhesion between the current collector and the positive electrode coating mixture desirably may be increased by including fine irregularities on a surface of the current collector interfacing with the coating mixture. Moreover, various structural configurations of the positive electrode current collector may be used, such as a film, a sheet, a foil, a net, a porous body, a foam body, and a non-woven body. The positive electrode current collector generally may have a thickness in a range from 3 μm to 500 μm.

The conductive material in the positive electrode coating mixture generally may be included in an amount from 1 to 50 wt % of the total weight of the mixture including the positive electrode active material. The conductive material is not particularly limited and preferably has conductivity without causing a chemical change when used in a battery. For example, graphite, such as natural graphite and artificial graphite; carbon black, such as carbon black, acetylene black, Ketjen black, channel black, furnace black, lamp black, and summer black; conductive fibers, such as carbon fibers and metal fibers; carbon and metal powders, such as carbon fluoride, aluminum, and nickel powder; conductive whiskeys, such as zinc oxide and potassium titanate; conductive metal oxides, such as titanium oxide; and polyphenylene derivatives, may be used for the conductive material.

The binder in the positive electrode coating mixture assists in bonding between the active material and the conductive material in bonding the coating mixture to the current collector. Such binder is generally included in an amount from 1 to 50% by weight of the total weight of the mixture including the positive electrode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluororubber, and various copolymers.

The filler optionally added to the positive electrode coating mixture may be used as a component to suppress the expansion of the positive electrode. Such a filler is not particularly limited and may include a fibrous material that does not cause a chemical change when used in a battery. For example, olefin polymers, such as polyethylene and a polypropylene, and fibrous materials, such as glass fiber and carbon fiber, may be used.

In some arrangements, the negative electrode may be manufactured by coating, drying, and pressing a negative electrode active material on a negative electrode current collector, and, if necessary, the conductive materials, binders, fillers, and the like discussed above may be optionally further included. In any event, any appropriate materials used in the relevant field may be used, in particular those commonly used for the particular application. For example, as the negative electrode active material, carbon, such as non-graphitizable carbon and graphitic carbon; metal composite oxide represented by the chemical formulas $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, elements of groups 1, 2 and 3 of the periodic table, and halogens; $0<x\leq1$; $1\leq y\leq3$; $1\leq z\leq8$); lithium metal; lithium alloys; silicon-based alloys; tin-based alloys; metal oxides, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers, such as polyacetylene; and Li—Co—Ni-based materials may be used.

The materials that may be used for the negative electrode current collector are not particularly limited. The negative electrode current collector preferably has high conductivity without causing a chemical change in the battery. For example, copper; stainless steel; aluminum; nickel; titanium; calcined carbon; a material in which a surface of copper or stainless steel is surface-treated with carbon, nickel, titanium, silver, and the like; and an aluminum-cadmium alloy may be used.

In addition, like the positive electrode current collector, the bond between the negative electrode current collector and the negative electrode active material may be strengthened by forming fine irregularities on the surface of the positive electrode current collector. Various structural configurations of the negative electrode current collector may also be used, such as a film, a sheet, a foil, a net, a porous body, a foam body, a non-woven body, and the like. In addition, the negative electrode current collector may have a thickness generally in a range of 3 μm to 500 μm.

In some arrangements, the separator may be an organic/inorganic complex porous SRS (Safety-Reinforcing Separator). The SRS may have a structure in which a coating layer component including inorganic particles and a binder polymer is coated on a polyolefin-based separator substrate.

Since the SRS does not undergo high-temperature thermal contraction due to the heat resistance of the component inorganic particles, even if the electrode assembly is penetrated by a needle-shaped conductor, an elongated length of the safety separator can be maintained.

The SRS may have a uniform porous structure formed by an interstitial volume between the inorganic particles that are components of the coating layer, in addition to the porous structure of the separator substrate itself. The pores may not only significantly alleviate any external impacts applied to the electrode assembly, but may also facilitate the movement of lithium ions through the pores, as well as enable a large amount of electrolyte to be impregnated into the separator, thereby promoting improved performance of the battery.

In some arrangements, the separator may be dimensioned in its width dimension (orthogonal to the longitudinal dimension in which the separator is unrolled) such that separator portions extend outwardly on both sides beyond corresponding edges of adjacent positive and negative electrodes (hereinafter "surplus portions"). Moreover, such outwardly extending portions of the separator may have a structure including a coating layer thicker than a thickness of the separator formed on one or both sides of the separator in order to prevent shrinkage of the separator. For more information regarding the thicker coating layer on the outwardly extending surplus portions of the separator, see Korean Patent Application Publication No. 10-2016-0054219, the entire contents of which are incorporated herein by reference. In some arrangements, each separator surplus portion may have a size of 5% to 12% of the width of the separator. Moreover, in some arrangements, the coating layer may be coated on both surfaces of the separator over a width of 50% to 90% of the width of each separator surplus portion. In addition, the widths of the coating layers may be the same or different on each surface of the separator. In some arrangements, the coating layer may include inorganic particles and a binder polymer as components.

In exemplary embodiments of the present invention, examples of the polyolefin-based separator component may include high-density polyethylene, linear low-density polyethylene, low-density polyethylene, ultra-high molecular weight polyethylene, polypropylene, or derivatives thereof.

In some arrangements, the thickness of the coating layer may be smaller than the thickness of the first electrode or the second electrode. In some such arrangements, the thickness of the coating layer may be 30% to 99% of the thickness of the first electrode or the second electrode.

In some arrangements, the coating layer may be formed by wet coating or dry coating.

In some arrangements, the polyolefin-based separator substrate and the coating layer may exist in a form in which pores on the surface of the substrate and the coating layer are anchored with each other, whereby the separator substrate and the coating layer may be bonded together firmly.

The substrate and the coating layer of the separator may have a thickness ratio from 9:1 to 1:9. A preferred thickness ratio may be 5:5.

In some arrangements, the inorganic particles may be inorganic particles commonly used in the art. The inorganic particles may interact with each other to form micropores in the form of empty spaces between the inorganic particles while structurally helping to maintain the physical shape of the coating layer. In addition, since the inorganic particles generally have properties that do not change their physical properties even at high temperatures of 200° C. or more, the resultant organic/inorganic complex porous film generally and desirably has excellent heat resistance.

In addition, the materials that may be used for the inorganic particles are not particularly limited but are preferably electrochemically stable. That is, the inorganic particles are preferably selected such that oxidation and/or reduction reactions do not occur in the operating voltage range of the applied battery (for example, 0 to 5 V based on Li/Li+). In particular, the use of inorganic particles having ion transport ability may improve performance by increasing the ionic conductivity in the electrochemical device. Thus, use of inorganic particles having ionic conductivity as high as possible is preferable. In addition, when the inorganic particles have a high density, it is difficult to disperse the inorganic particles during coating, and it can also undesirably increase the weight of the battery. Therefore, use of inorganic particles having density as low as possible is preferable. In addition, inorganic materials having a high dielectric constant contribute to an increase in the degree of dissociation of electrolyte salt, such as a lithium salt, in a liquid electrolyte, thereby improving the ionic conductivity of the electrolyte.

For the above reasons, the inorganic particles may be at least one type selected from the group consisting of inorganic particles having piezoelectricity and inorganic particles having lithium ion transport ability.

Inorganic particles having piezoelectricity refer to materials which are a nonconductor at normal pressure, but have a property of conducting electricity due to a change in the internal structure when a certain pressure is applied. They are also materials which exhibit high permittivity characteristics with a permittivity constant of 100 or more. Inorganic particles having piezoelectricity also generate an electric potential difference between opposing surfaces, e.g., of a separator, by causing one surface to be positively charged and the other surface to be negatively charged, or vice versa, when either tension or compression is applied to an object composed of the inorganic particles, e.g., a separator.

When the inorganic particles having the above characteristics are used as a coating layer component, in the case of an internal short circuit of both electrodes due to an external impact, such as by a needle-shaped conductor, the positive electrode and the negative electrode may not directly contact one another due to the inorganic particles coated on the separator. Moreover, due to the piezoelectricity of the inorganic particles, an electric potential difference may occur within the particles, which desirably may result in electron movement between both electrodes (i.e., the flow of a minute current), so that it may be possible to gently reduce the voltage of the battery, thereby improving safety.

Examples of materials for the inorganic particles having piezoelectricity may be one or more selected from the group consisting of $BaTiO_3$, $Pb(Zr,Ti)O_3$ (PZT), those represented by the chemical formula $Pb_{1-x}La_xZr_{1-y}Ti_yO_3$ (PLZT), $PB(Mg_3Nb_{2/3})O_3$—$PbTiO_3$ (PMN-PT), and hafnia ($HfO_2$), but are not limited to these materials.

Inorganic particles having lithium-ion transport ability refer to inorganic particles containing a lithium element but not storing lithium and instead having a function of moving lithium ions. The inorganic particles having lithium-ion transport ability are capable of transporting and moving lithium ions due to a kind of defect in the particle structure. As a result, the lithium-ion conductivity in the battery may be improved, thereby improving battery performance.

Examples of materials for the inorganic particles having lithium-ion transport ability may be one or more selected from the group consisting of lithium phosphate ($Li_3PO_4$), lithium titanium phosphate (represented by the chemical formula $Li_xTi_y(PO_4)_3$, wherein $0<x<2$, $0<y<3$), lithium aluminum titanium phosphate (represented by the chemical formula $Li_xAl_yTi_z(PO_4)_3$, wherein $0<x<2$, $0<y<1$, $0<z<3$), glass of the series represented by the chemical formula $(LiAlTiP)_xO_y$, ($0<x<4$, $0<y<13$), lithium lanthanum titanate (represented by the chemical formula $Li_xLa_yTiO_3$, wherein $0<x<2$, $0<y<3$), lithium germanium thiophosphate (represented by the chemical formula $Li_xGe_yP_zS_w$, wherein $0<x<4$, $0<y<1$, $0<z<1$, $0<w<5$), lithium nitride (represented by the chemical formula $Li_xN_y$, wherein $0<x<4$, $0<y<2$), glass of the $SiS_2$ series (represented by the chemical formula $Li_xSi_yS_z$, wherein $0<x<3$, $0<y<2$, $0<z<4$), and glass of the $P_2S_5$ series (represented by the chemical formula $Li_xP_yS_z$, wherein $0<x<3$, $0<y<3$, $0<z<7$), but are not limited to these materials.

The composition ratio of the inorganic particles and the binder polymer, which are components of the coating layer of the separator, is not particularly limited, but may be adjusted within the range of 10:90 to 99:1 by weight %, and preferably within the range of 80:20 to 99:1 by weight %. When the composition ratio is less than 10:90 by weight %, the content of the polymer may become excessively large and the pore size and porosity may be reduced due to a decrease in the empty space formed between the inorganic particles, finally resulting in deterioration of the battery performance. On the other hand, when the composition ratio exceeds 99:1 by weight %, the content of the polymer may be too small, and the mechanical properties of the final organic/inorganic composite porous separator may become deteriorated due to weakened adhesive force between the inorganic materials.

In some arrangements, a binder polymer commonly used in the art may be used as the binder polymer.

The coating layer of the organic/inorganic composite porous separator may further include other commonly known additives in addition to the aforementioned inorganic particles and binder polymer.

In some arrangements, the coating layer may be referred to as an active layer.

Although the present invention has been described in detail through specific exemplary embodiments, the electrode assembly according to the present invention is not limited thereto. Various different implementations may be made by those of ordinary skill in the art within the technical spirit of the present invention.

1) EXAMPLE 1

19 positive electrode sheets, 20 negative electrode sheets, and an elongated separator were supplied to the stack table from the respective positive electrode supply unit, negative electrode supply unit, and separator supply unit.

More specifically, the positive electrode and the negative electrode were supplied after being cut from a positive electrode sheet and a negative electrode sheet, respectively, and the separator was supplied in the form of an elongated separator sheet. Thereafter, the supplied separator was folded while rotating the stack table and stacking the positive electrodes and the negative electrode as described above. A holding mechanism was used to press down on and stabilize the stack on the stack table, which resulted in a stack including 39 electrodes.

After manufacturing the stack, a primary heat press operation was performed by gripping the stack with the gripper and pressing for 15 seconds while heating the stack under a temperature condition of 70° C. and a pressure condition of 1.91 MPa.

After the primary heat press operation, the secondary heat press operation was performed, in which a pressing block was heated to a temperature of 70° C. (temperature condition) and a pressure of 2.71 Mpa (pressure condition) was applied to the stack with the heated pressing block for 10 seconds (press time), thus resulting in the electrode assembly of Example 1.

In the process of manufacturing the electrode assembly, the above-described disclosure of the present invention may be applied.

2) EXAMPLES 2 TO 12

Electrode assemblies of Examples 2 to 12 were manufactured in the same manner as in Example 1, except that the secondary heat press operation was performed under the temperature conditions, pressure conditions, and press time represented in Table 1 below. That is, the primary heat press conditions of Examples 1 to 12 were the same.

TABLE 1

| | Primary heat press | | | |
| | Temperature condition | Pressure condition Press area (314.57 cm$^2$) | | Press time |
| | (° C.) | Tonf | MPa | (s) |
|---|---|---|---|---|
| Example 1 | 70 | 6 | 1.91 | 15 |
| Example 2 | | | | |
| Example 3 | | | | |
| Example 4 | | | | |
| Example 5 | | | | |
| Example 6 | | | | |
| Example 7 | | | | |
| Example 8 | | | | |
| Example 9 | | | | |
| Example 10 | | | | |
| Example 11 | | | | |
| Example 12 | | | | |

TABLE 1-continued

| | Secondary heat press | | | |
| | Temperature condition | Pressure condition Press area (554.1 cm$^2$) | | Press time |
| | (° C.) | Tonf | MPa | (s) |
|---|---|---|---|---|
| Example 1 | 70 | 5 | 2.71 | 10 |
| Example 2 | 70 | 5 | 2.71 | 20 |
| Example 3 | 70 | 4 | 2.17 | 10 |
| Example 4 | 70 | 4 | 2.17 | 20 |
| Example 5 | 60 | 4 | 2.17 | 10 |
| Example 6 | 60 | 4 | 2.17 | 20 |
| Example 7 | 60 | 5 | 2.71 | 10 |
| Example 8 | 60 | 5 | 2.71 | 20 |
| Example 9 | 80 | 4 | 2.17 | 10 |
| Example 10 | 80 | 4 | 2.17 | 20 |
| Example 11 | 80 | 5 | 2.71 | 10 |
| Example 12 | 80 | 5 | 2.71 | 20 |

3) COMPARATIVE EXAMPLES 1 TO 5

Electrode assemblies of Comparative Examples 1 to 5 were manufactured in the same manner as in Example 1, except that the primary heat press operation was performed under the temperature conditions, pressure conditions, and press time represented in Table 2 below in Example 1, and the secondary heat press operation was not performed.

TABLE 2

| | Primary heat press | | | |
| | Temperature condition | Pressure condition Press area (314.57 cm$^2$) | | Press (s) |
| | (° C.) | Tonf | MPa | time |
|---|---|---|---|---|
| Comparative Example 1 | 70 | 6 | 1.91 | 8 |
| Comparative Example 2 | 80 | 6 | 1.91 | 8 |
| Comparative Example 3 | 90 | 4 | 1.27 | 8 |
| Comparative Example 4 | 90 | 4 | 1.27 | 15 |
| Comparative Example 5 | 90 | 6 | 1.91 | 8 |
| Comparative Example 6 | 90 | 8 | 2.54 | 8 |
| Comparative Example 7 | 90 | 8 | 2.54 | 15 |

| | Secondary heat press (not performed) | | | |
| | Temperature condition | Pressure condition Press area (554.1 cm$^2$) | | Press (s) |
| | (° C.) | Tonf | MPa | time |
|---|---|---|---|---|
| Comparative Example 1 | — | — | — | — |
| Comparative Example 2 | — | — | — | — |
| Comparative Example 3 | — | — | — | — |
| Comparative Example 4 | — | — | — | — |
| Comparative Example 5 | — | — | — | — |
| Comparative Example 6 | | | | |
| Comparative Example 7 | | | | |

All of the electrode assemblies of Examples 1 to 12 and Comparative Examples 1 to 5 manufactured under the conditions of Tables 1 and 2 were tested by picking each of them up with a vacuum suction mechanism under the same conditions as the electrode supply unit discussed above, and the vacuum suction mechanism attempted to hold the electrode assemblies for 60 sections. In all the electrode assemblies of Comparative Examples 1 to 5, it was observed that the electrodes and separator became separated before 60 seconds. That means that the electrode assemblies of Comparative Examples 1 to 5 had poor adhesion between the electrode and the separator, whereas the electrode assembly according to the present application (which was subjected to the primary and the secondary press operations), had a good adhesion state, and thus had the excellent effect of preventing the resisting any unfolding and falling apart of the electrode assembly.

In the case of Comparative Examples 6 and 7, although the electrodes and separator were not observed to separate before 60 seconds, it was confirmed that damage to the electrode assembly occurred. This is considered to be because the first press was performed under a pressure condition of 2.54 Mpa (i.e., high pressure).

4) EXPERIMENTAL EXAMPLE 1

Evaluation of Adhesive Force

Adhesive forces between surfaces at the upper end, the lower end, and the middle of the stack S were measured by disassembling (i.e., separating the layers of) the electrode assemblies of Examples 1 to 12 and Comparative Examples 6 and 7 (in which the separation of the electrodes and separator were not observed before 60 seconds in the previous test) and then analyzing the separated layers. Specifically, adhesive force between the negative electrode and the separator located at the lowermost end of the stack was measured. Additionally, adhesive force between the negative electrode and the separator located at the uppermost end of the stack was measured. Finally, adhesive force between the negative electrode and the separator located at a middle location along the stacking direction of the stack was measured In each of the separated electrode assemblies, the negative electrode and the separator sampled had a width of 55 mm and a length of 20 mm. The sampled sample was adhered to the slide glass with the electrode being positioned on the adhesive surface of the slide glass. After that, the slide glass with the sample was mounted to the adhesive force measuring device and tested by performing 90° peel test at a speed of 100 mm/min pursuant to the testing method set forth in ASTM-D6862, as discussed above. After discounting any initial significant fluctuations, the values for applied force per sample width (in grams/mm) were measured while the separator was peeled away from the electrode.

The results are represented in Table 3 below.

TABLE 3

| | Negative electrode adhesive force (gf/20 mm) | | | |
|---|---|---|---|---|
| | Upper surface | Middle | Lower surface | deviation |
| Example 1 | 19.8 | 10.8 | 21.5 | 10.7 |
| Example 2 | 20.3 | 9.7 | 19.5 | 10.6 |
| Example 3 | 9.9 | 5.2 | 11.4 | 6.2 |

TABLE 3-continued

| | Negative electrode adhesive force (gf/20 mm) | | | |
|---|---|---|---|---|
| | Upper surface | Middle | Lower surface | deviation |
| Example 4 | 16.6 | 9.2 | 17 | 7.8 |
| Example 5 | 9.4 | 4.0 | 9.9 | 5.9 |
| Example 6 | 11.1 | 7.1 | 14.3 | 7.2 |
| Example 7 | 7.9 | 6.2 | 10.5 | 4.3 |
| Example 8 | 13.4 | 8.9 | 18 | 9.1 |
| Example 9 | 14 | 5.2 | 10.4 | 8.8 |
| Example 10 | 14.2 | 7.9 | 14.6 | 6.7 |
| Example 11 | 16.7 | 7.2 | 18.5 | 11.3 |
| Example 12 | 25.3 | 12.0 | 22.4 | 13.3 |
| Comparative Example 6 | 15.6 | 7.2 | 25.9 | 18.7 |
| Comparative Example 7 | 30.7 | 12.6 | 25.1 | 18.1 |

In the case of Comparative Examples 6 and 7, as described above, the vacuum suction was carried out under the pressure condition of 2.54 Mpa, so that it was confirmed that damage may occur to the electrode assembly. Moreover, referring to the results of Table 3, the deviation of the adhesive force was significantly greater than 15 gf/20 mm. This means that the performance of the electrode assembly may not be uniform depending on the location.

On the other hand, in the case of Examples 1 to 12, it was confirmed that the deviation of the adhesive force was less than 15 gf/20 mm, which was not significant. That is, it was confirmed that the electrode assemblies of Examples 1 to 12 had uniform performance.

5) EXPERIMENTAL EXAMPLE 2

Evaluation of Air Permeability

Among Examples 1 to 12, the air permeability of the electrode assemblies of Examples 1, 6, and 12, which differed only in the temperature condition of the secondary press, was evaluated.

Specifically, after collecting the separators in the electrode assemblies of Examples 1, 6, and 12, the separators were cut to prepare separator samples having a size of 5 cm×5 cm (width×length). After that, the separator samples were washed with acetone.

Air permeability of Examples 1, 6, and 12 were measured by measuring the time it took for 100 ml (or 100 cc) of air to pass through the separator of 1 square inch at room temperature and under the pressure condition of 0.05 MPa by using a Gurley type Densometer (No. 158) from Toyoseiki in accordance with the JIS Gurley measurement method of the Japanese industrial standard.

The results are represented in Table 4.

TABLE 4

| | Air permeability | | | |
|---|---|---|---|---|
| | Upper surface | Middle | Lower surface | Deviation |
| Example 1 | 88 | 76 | 84 | 11.1 |
| Example 6 | 88 | 75 | 87 | 12.3 |
| Example 12 | 101 | 84 | 100 | 17.4 |

From the results of Table 4, when the condition of the secondary heat press operation according to the present invention is satisfied, it was confirmed that the air permeability corresponding to each location was less than 120 sec/100 ml, although they had an appropriate level of air permeability for use as an electrode assembly. It was also confirmed that the deviations in air permeability between each location were also less than 20 sec/100 ml, which was considered to be substantially uniform. That is, it was confirmed once again that the electrode assembly manufactured by the manufacturing method according to the present invention had uniform performance.

It is noted that the air permeability deviation was the smallest in the case of Example 1 with the temperature condition of 70° C.

Through the above experimental examples, it was confirmed that the electrode assembly according to the present invention had proper and uniform air permeability and adhesive force.

What is claimed is:

1. A method of manufacturing an electrode assembly, the method comprising:
    assembling an electrode stack including a plurality of electrodes stacked along a stacking axis with a respective separator portion positioned between each of the electrodes;
    after assembling the electrode stack, performing a primary heat press operation on the electrode stack, the primary heat press operation comprising engaging the electrode stack with a gripper to secure a position of the electrode stack and then, while the gripper is engaged with the electrode stack, applying heat and pressure to the electrode stack; and
    after the primary heat press operation, performing a secondary heat press operation on the electrode stack, the secondary heat press operation comprising disengaging the gripper from the electrode stack and then applying heat and pressure to the electrode stack,
    wherein the secondary heat press operation includes applying heat and pressure to the electrode stack for a time period from 5 seconds to 60 seconds under a temperature condition from 50° ° C. to 90° ° C. and under a pressure condition from 1 Mpa to 6 Mpa.

2. The method of claim 1, wherein the separator portions are portions of an elongated separator sheet, and wherein the step of assembling the electrode stack includes alternately stacking a first one of the electrodes and a second one of the electrodes on the elongated separator sheet, where the elongated separator sheet is sequentially folded over a previously-stacked one of the first and second electrodes before a subsequent one of the first and second electrode is stacked.

3. The method of claim 2, wherein the step of assembling the electrode stack includes:
    (1) positioning the elongated separator sheet on a stack table;
    (2) stacking one of the first electrodes on an upper surface of the elongated separator sheet;
    (3) rotating the stack table while covering an upper surface of the one of the first electrodes with the elongated separator sheet; and
    (4) stacking one of the second electrodes on a portion of the elongated separator sheet covering the upper surface of the one of the first electrodes,
    wherein the above steps (1) to (4) are repeated one or more times.

4. The method of claim 3, wherein the electrode stack is secured to the stack table by a holding mechanism.

5. The method of claim 2, further comprising using a camera to inspect the stacking of the first electrode or the second electrode.

6. The method of claim 1, wherein the steps of applying pressure to the electrode stack in both of the primary and secondary heat press operations include:
    advancing a pressing block along the stacking axis and into engagement with the electrode stack.

7. The method of claim 6, wherein the pressing block is heated to transfer heat to the electrode stack.

8. The method of claim 1, wherein the primary heat press operation includes applying heat and pressure to the electrode stack for a time period from 10 seconds to 30 seconds under a temperature condition from 65° C. to 90° C. and under a pressure condition from 1 Mpa to 3 Mpa.

9. The method of claim 1, wherein the step of assembling the electrode stack includes winding an elongated separator sheet around an outer circumference of the electrode stack.

10. The method of claim 1, further comprising heating at least one of the electrodes and the separator portions before the step of assembling the electrode stack.

11. An apparatus for manufacturing an electrode assembly including an electrode stack having a plurality of first and second electrodes stacked along a stacking axis with a respective separator positioned between each of the first and second electrodes, the apparatus comprising:
    a press unit for bonding together the electrodes and the separator portions within the electrode stack, by applying heat and pressure to the electrode stack, the press unit being divided into a first press unit and a second press unit, the first press unit being used for a primary heat press operation, and the second press unit being used for a secondary heat press operation performed after the primary heat press operation; and
    a gripper for engaging the electrode stack to secure a position of the electrode stack when the heat and pressure is applied to the electrode stack by the press unit,
    wherein the apparatus for manufacturing the electrode assembly including the gripper and the press unit are configured to apply heat and pressure to the electrode stack while the gripper is coupled to the electrode stack or while the gripper is separated from the electrode stack,
    wherein the primary heat press operation includes engaging the electrode stack with the gripper to secure a position of the electrode stack and then, while the gripper is engaged with the electrode stack, applying heat and pressure to the electrode stack, and
    wherein the secondary heat press operation includes disengaging the gripper from the electrode stack and then applying heat and pressure to the electrode stack for a time period from 5 seconds to 60 seconds under a temperature condition from 50° C. to 90° C. and under a pressure condition from 1 Mpa to 6 Mpa.

12. The apparatus of claim 11, further comprising:
    a stack table for supporting the electrode stack;
    a separator supply unit for supplying the separator to the stack table;
    a first electrode supply unit for supplying the first electrodes to the stack table;
    a second electrode supply unit for supplying the second electrodes to the stack table;
    a first electrode stack unit for moving the first electrodes supplied from the first electrode supply unit to the stack table; and
    a second electrode stack unit for moving the second electrodes supplied from the second electrode supply unit to the stack table.

13. The apparatus of claim 12, wherein the first electrode supply unit includes a first electrode seating table on which the first electrodes are seated before being stacked on the stack table by the first electrode stack unit, and the second electrode supply unit includes a second electrode seating table on which the second electrodes are seated before being stacked on the stack table by the second electrode stack unit.

14. The apparatus of claim 12, wherein the first electrode stack unit includes a first suction head for picking up the first electrode by vacuum suction, and the second electrode stack unit includes a second suction head for picking up the second electrode by vacuum suction.

15. The apparatus of claim 12, further comprising:

a rotating unit for rotating the stack table between a first position and a second position, the first position being oriented towards the first electrode stack unit for receiving the first electrodes from the first electrode stack unit, and the second position being oriented towards the second electrode stack unit for receiving the second electrodes from the second electrode stack unit.

16. The apparatus of claim 11, wherein the gripper is configured to apply downward pressure on an upper surface of the electrode stack along the stacking axis so as to secure the position of the electrode stack relative to the press unit.

17. The apparatus of claim 11, wherein the press unit further includes a pressing block and a press heater for heating the pressing block, and wherein the pressing block is configured to advance along the stacking axis of the electrode stack to apply heat and pressure to the electrode stack.

\* \* \* \* \*